US010826568B1

(12) United States Patent
Zhou et al.

(10) Patent No.: US 10,826,568 B1
(45) Date of Patent: Nov. 3, 2020

(54) SIMULTANEOUS MULTIPLE DEFAULT BEAMS

(71) Applicant: QUALCOMM Incorporated, San Diego, CA (US)

(72) Inventors: Yan Zhou, San Diego, CA (US); Xiaoxia Zhang, San Diego, CA (US); Xiao Feng Wang, San Diego, CA (US); Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/844,215

(22) Filed: Apr. 9, 2020

Related U.S. Application Data

(60) Provisional application No. 62/843,342, filed on May 3, 2019.

(51) Int. Cl.
*H04B 7/0408* (2017.01)
*H04B 7/08* (2006.01)
(Continued)

(52) U.S. Cl.
CPC ........... *H04B 7/0408* (2013.01); *H04B 7/024* (2013.01); *H04B 7/0404* (2013.01); *H04B 7/086* (2013.01)

(58) Field of Classification Search
CPC .... H04B 7/0408; H04B 7/024; H04B 7/0404; H04B 7/086; H04B 7/022; H04B 7/04;
(Continued)

(56) References Cited

U.S. PATENT DOCUMENTS 10,548,181 B2 * 1/2020 Siomina ................ H04W 24/10
10,554,470 B2 * 2/2020 John Wilson ....... H04W 52/346
(Continued)

OTHER PUBLICATIONS

Interdigital, et al., "Remaining Issues on Beam Management", 3GPP Draft, R1-1720630, 3GPP TSG RAN WG1 Meeting #91, Beam Management, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017 (Nov. 18, 2017), XP051370095, 13 pages, Retrieved from the Internet: URL: http://www.3gpp.org/ftp/tsg%5Fran/WG1%5FRL1/TSGR1%5F91/Docs/. [retrieved on Nov. 18, 2017] Section 2.1.2.3.
(Continued)

*Primary Examiner* — James M Perez
(74) *Attorney, Agent, or Firm* — Holland & Hart LLP

(57) ABSTRACT

Methods, systems, and devices for wireless communications are described. Aspects include a user equipment (UE) identifying that an offset between a physical downlink control channel and a physical downlink shared channel is below a threshold. In response to identifying that the offset is below a threshold, the UE may receive a first beam from a first transmission reception point using a first set of beamforming parameters and a second beam from a second transmission reception point using a second set of beamforming parameters. The UE may buffer a first set of downlink transmissions received on the first beam and a second set of downlink transmissions received on a second beam. The UE may decode the buffered first set of downlink transmissions and the buffered second set of downlink transmission. In some cases, the UE may identify a configuration of one or more control resource sets to determine beamforming parameters.

30 Claims, 19 Drawing Sheets

(51) Int. Cl.
*H04B 7/0404* (2017.01)
*H04B 7/024* (2017.01)

(58) Field of Classification Search
CPC ...... H04B 7/0452–0473; H04B 7/0491; H04B 7/0495; H04B 7/2609
See application file for complete search history.

(56) References Cited

U.S. PATENT DOCUMENTS

| | | | | |
|---|---|---|---|---|
| 10,638,469 B2* | 4/2020 | Hosseini | ............ | H04W 72/042 |
| 10,645,590 B2* | 5/2020 | Yerramalli | ........ | H04W 72/1215 |
| 10,651,917 B2* | 5/2020 | John Wilson | ......... | H04L 1/1607 |
| 2015/0043465 A1* | 2/2015 | Ouchi | .................. | H04W 72/12 370/329 |
| 2018/0343653 A1* | 11/2018 | Guo | ....................... | H04L 5/0053 |
| 2019/0141693 A1* | 5/2019 | Guo | ....................... | H04B 7/088 |
| 2019/0159100 A1* | 5/2019 | Liou | .................... | H04L 5/0091 |
| 2019/0190582 A1* | 6/2019 | Guo | ....................... | H04L 5/0048 |
| 2019/0199571 A1* | 6/2019 | John Wilson | ........ | H04J 11/0056 |
| 2019/0222284 A1* | 7/2019 | Huang | .................. | H04L 5/0048 |
| 2019/0222289 A1* | 7/2019 | John Wilson | ........ | H04B 7/0695 |
| 2019/0229792 A1* | 7/2019 | John Wilson | ........ | H04B 7/0626 |
| 2019/0246395 A1* | 8/2019 | Huang | .................. | H04L 5/0003 |
| 2019/0253220 A1* | 8/2019 | Kim | ....................... | H04L 5/0053 |
| 2019/0260445 A1* | 8/2019 | John Wilson | ........ | H04B 7/0634 |
| 2019/0260458 A1* | 8/2019 | Zhou | .................... | H04B 7/0877 |
| 2019/0260524 A1* | 8/2019 | Nam | ..................... | H04L 1/0045 |
| 2019/0273637 A1* | 9/2019 | Zhang | .................. | H04B 5/0031 |
| 2019/0281587 A1* | 9/2019 | Zhang | .................. | H04L 5/0044 |
| 2019/0297637 A1* | 9/2019 | Liou | .................... | H04W 72/1289 |
| 2019/0297640 A1* | 9/2019 | Liou | .................... | H04W 48/12 |
| 2019/0313429 A1* | 10/2019 | Cheng | .................. | H04W 48/12 |
| 2019/0320469 A1* | 10/2019 | Huang | .................. | H04L 5/0053 |
| 2019/0342907 A1* | 11/2019 | Huang | .................. | H04L 5/0048 |
| 2019/0349061 A1* | 11/2019 | Cirik | .................... | H04W 80/02 |
| 2019/0349964 A1* | 11/2019 | Liou | .................... | H04W 72/1284 |
| 2019/0357215 A1* | 11/2019 | Zhou | .................... | H04W 72/0446 |
| 2019/0357261 A1* | 11/2019 | Cirik | .................... | H04L 5/0098 |
| 2019/0357292 A1* | 11/2019 | Cirik | .................... | H04W 76/19 |
| 2019/0394082 A1* | 12/2019 | Cirik | .................... | H04L 5/0048 |
| 2020/0014510 A1* | 1/2020 | Wu | ....................... | H04L 5/0092 |
| 2020/0022175 A1* | 1/2020 | Xiong | .................. | H04W 72/042 |
| 2020/0029274 A1* | 1/2020 | Cheng | .................. | H04W 24/10 |
| 2020/0029316 A1* | 1/2020 | Zhou | ................. | H04W 74/0833 |
| 2020/0044723 A1* | 2/2020 | Cirik | .................... | H04W 36/06 |
| 2020/0045745 A1* | 2/2020 | Cirik | ................. | H04W 74/0833 |
| 2020/0052769 A1* | 2/2020 | Cirik | .................... | H04B 7/0695 |
| 2020/0053613 A1* | 2/2020 | Cirik | .................... | H04W 76/27 |
| 2020/0053767 A1* | 2/2020 | Bai | ....................... | H04B 7/0695 |
| 2020/0053776 A1* | 2/2020 | John Wilson | ..... | H04W 72/1294 |
| 2020/0077283 A1* | 3/2020 | Zhou | .................... | H04B 7/0695 |
| 2020/0077369 A1* | 3/2020 | Zhang | .................. | H04B 7/0617 |
| 2020/0092860 A1* | 3/2020 | Khoshnevisan | ...... | H04L 5/0048 |
| 2020/0100154 A1* | 3/2020 | Cirik | .................... | H04W 36/06 |
| 2020/0100276 A1* | 3/2020 | Oh | .................... | H04W 72/1289 |
| 2020/0100311 A1* | 3/2020 | Cirik | .................... | H04W 72/042 |
| 2020/0112941 A1* | 4/2020 | Yerramalli | ............ | H04W 28/04 |
| 2020/0145062 A1* | 5/2020 | Jung | .................... | H04W 52/0212 |
| 2020/0145169 A1* | 5/2020 | Zhou | .................... | H04W 80/02 |
| 2020/0145280 A1* | 5/2020 | Cirik | .................... | H04W 72/10 |
| 2020/0145982 A1* | 5/2020 | Cheng | .................. | H04W 72/048 |
| 2020/0145998 A1* | 5/2020 | Sun | .......................... | H04B 7/00 |
| 2020/0146059 A1* | 5/2020 | Cirik | .................... | H04W 74/085 |
| 2020/0153666 A1* | 5/2020 | Khoshnevisan | .... | H04L 25/0204 |
| 2020/0163035 A1* | 5/2020 | Fu | ........................ | H04L 1/1819 |
| 2020/0177323 A1* | 6/2020 | Fakoorian | ................. | H04L 1/18 |
| 2020/0178239 A1* | 6/2020 | Yi | ......................... | H04L 1/1812 |

OTHER PUBLICATIONS

International Search Report and Written Opinion—PCT/US2020/027601—ISA/EPO—dated Jun. 2, 2020.
Samsung: "On Beam Management, Measurement and Reporting", 3GPP TSG RAN WG1 Meeting #91, 3GPP Draft; R1-1720290_V1, 3rd Generation Partnership Project (3GPP), Mobile Competence Centre, 650, Route Des Lucioles; F-06921 Sophia-Antipolis Cedex, France, vol. RAN WG1, No. Reno, USA; Nov. 27, 2017-Dec. 1, 2017, Nov. 17, 2017 (Nov. 17, 2017), XP051368939, 15 pages, Retrieved from the Internet: URL: http://www.3gpp.org/ftp/tsg_ran/WG1_RL1/TSGR1_91/Docs/ [retrieved on Nov. 17, 2017] the whole document.

* cited by examiner

US 10,826,568 B1

SIMULTANEOUS MULTIPLE DEFAULT BEAMS

CROSS REFERENCE

The present Application for Patent claims the benefit of U.S. Provisional Patent Application No. 62/843,342 by ZHOU et al., entitled "SIMULTANEOUS MULTIPLE DEFAULT BEAMS," filed May 3, 2019, assigned to the assignee hereof, and expressly incorporated by reference herein.

FIELD OF INVENTION

The following relates generally to wireless communications, and more specifically to simultaneous multiple default beams.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A base station such as a next generation or giga nodeB (gNB) may support communications using one or more transmission reception points (TRPs) to improve reliability, coverage, and capacity performance. In some cases, a UE may establish beamformed communications links with multiple TRPs to simultaneously receive and transmit communications with the multiple TRPs. A UE may receive a physical downlink control channel (PDCCH), decode control information from the PDCCH and decode a subsequent physical downlink shared channel (PDSCH) transmission using the decoded control information.

SUMMARY

The described techniques relate to improved methods, systems, devices, and apparatuses that support simultaneous multiple default beams. Generally, the described techniques provide for configuring communications between a UE and multiple transmission reception points (TRPs). A UE or base station may determine that the time offset between a physical downlink control channel (PDCCH) and a physical downlink shared channel (PDSCH) is below a threshold. In response, the UE or base station may configure multiple default receive beams for simultaneously buffering multiple PDCCH transmissions from the multiple TRPs. In some cases, the UE may receive a first PDSCH transmission from a first TRP using a first set of beamforming parameters and a second PDSCH transmission from a second TRP using a second set of beamforming parameters. The UE may buffer the first PDSCH transmission received on the first beam from a first TRP using a first default receive beam and may buffer the second PDSCH transmission received on the second beam from a second TRP using a second default receive beam. The UE may decode the buffered first and second PDSCH transmissions based on decoding the corresponding PDCCH transmissions.

A method of wireless communication at a UE is described. The method may include identifying that an offset between a physical downlink control channel and a physical downlink shared channel is below a threshold. The method may further include receiving (e.g., simultaneously), based on the identification that the offset is below the threshold, a first beam from a first transmission reception point using a first set of beamforming parameters and a second beam from a second transmission reception point using a second set of beamforming parameters. The method may further include buffering a first set of downlink transmissions received on the first beam from the first transmission reception point and a second set of downlink transmissions received on the second beam from the second transmission reception point, and decoding the buffered first set of downlink transmissions and the buffered second set of downlink transmissions.

An apparatus for wireless communication at a UE is described. The apparatus may include a processor, memory in electronic communication with the processor, and instructions stored in the memory. The instructions may be executable by the processor to cause the apparatus to identify that an offset between a physical downlink control channel and a physical downlink shared channel is below a threshold. The instructions may be executable by the processor to further cause the apparatus to receive (e.g., simultaneously), based on the identification that the offset is below the threshold, a first beam from a first transmission reception point using a first set of beamforming parameters and a second beam from a second transmission reception point using a second set of beamforming parameters. The instructions may be executable by the processor to further cause the apparatus to buffer a first set of downlink transmissions received on the first beam from the first transmission reception point and a second set of downlink transmissions received on the second beam from the second transmission reception point, and decode the buffered first set of downlink transmissions and the buffered second set of downlink transmissions.

Another apparatus for wireless communication at a UE is described. The apparatus may include means for identifying that an offset between a physical downlink control channel and a physical downlink shared channel is below a threshold. The apparatus may further include means for receiving (e.g., simultaneously), based on the identification that the offset is below the threshold, a first beam from a first transmission reception point using a first set of beamforming parameters and a second beam from a second transmission reception point using a second set of beamforming parameters. The apparatus may further include means for buffering a first set of downlink transmissions received on the first beam from the first transmission reception point and a second set of downlink transmissions received on the second beam from the second transmission reception point, and decoding the buffered first set of downlink transmissions and the buffered second set of downlink transmissions.

A non-transitory computer-readable medium storing code for wireless communication at a UE is described. The code may include instructions executable by a processor to identify that an offset between a physical downlink control channel and a physical downlink shared channel is below a threshold. The code may include instructions executable by a processor to receive (e.g., simultaneously), based on the identification that the offset is below the threshold, a first beam from a first transmission reception point using a first set of beamforming parameters and a second beam from a second transmission reception point using a second set of beamforming parameters. The code may include instructions executable by a processor to buffer a first set of downlink transmissions received on the first beam from the first transmission reception point and a second set of downlink transmissions received on the second beam from the second transmission reception point, and decode the buffered first set of downlink transmissions and the buffered second set of downlink transmissions.

Some examples of the method, apparatuses, and non-transitory computer-readable medium described herein may further include operations, features, means, or instructions for identifying a configuration of one or more control resource sets for the UE to monitor in a slot, and determining the first set of beamforming parameters and the second set of beam forming parameters based on the identified configuration.

Some examples of the method, apparatuses, and non-transitory computer-readable medium described herein may further include operations, features, means, or instructions for identifying a subset of the one or more control resource sets for determining the first set of beamforming parameters and the second set of beam forming parameters, and determining, from the subset of the one or more control resource sets, a control resource set corresponding to a lowest control resource set identifier, where the first set of beamforming parameters and the second set of beam forming parameters may be determined based on the determined control resource set.

In some examples of the method, apparatuses, and non-transitory computer-readable medium described herein, the subset of the one or more control resource sets includes one or more single transmission reception point control resource sets, one or more multiple transmission reception point control resource sets, or some combination thereof. Some examples of the method, apparatuses, and non-transitory computer-readable medium described herein may further include operations, features, means, or instructions for receiving an indication of the subset of the one or more control resource sets, where the subset of the one or more control resource sets may be identified based on the indication.

In some examples of the method, apparatuses, and non-transitory computer-readable medium described herein, the indication may be received in radio resource control signaling, a media access control element, or downlink control information. In some examples of the method, apparatuses, and non-transitory computer-readable medium described herein, the subset of the one or more control resource sets includes both one or more single transmission reception point control resource sets and one or more multiple transmission reception point control resource sets.

Some examples of the method, apparatuses, and non-transitory computer-readable medium described herein may further include operations, features, means, or instructions for identifying a first single transmission reception point transmission configuration indicator state for the first transmission reception point and a second single transmission reception point transmission configuration indicator state for the second transmission reception point based on the control resource set corresponding to the lowest control resource set identifier, where the control resource set corresponding to the lowest control resource set identifier includes a first multiple transmission reception point control resource set.

In some examples of the method, apparatuses, and non-transitory computer-readable medium described herein, the first set of beamforming parameters may be determined based on the identified first single transmission reception point transmission configuration indicator state and the second set of beam forming parameters may be determined based on the identified second single transmission reception point transmission configuration indicator state. In some examples of the method, apparatuses, and non-transitory computer-readable medium described herein, the subset of the one or more control resource sets includes one or more multiple transmission reception point control resource sets.

Some examples of the method, apparatuses, and non-transitory computer-readable medium described herein may further include operations, features, means, or instructions for receiving both the first beam and the second beam in parallel during a first symbol.

In some examples of the method, apparatuses, and non-transitory computer-readable medium described herein, the first beam may be received during a first symbol and the second beam may be received during a second symbol. Some examples of the method, apparatuses, and non-transitory computer-readable medium described herein may further include operations, features, means, or instructions for identifying a first UE receive panel identification for the first beam from the first transmission reception point, and identifying a second UE receive panel identification for the second beam from the second transmission reception point. Some examples of the method, apparatuses, and non-transitory computer-readable medium described herein may further include operations, features, means, or instructions for transmitting a UE receive panel ID report indicating one or more pairs of beams that can be received by the UE simultaneously, where each beams of each of the one or more pairs of beams corresponds to different UE receive panels.

In some examples of the method, apparatuses, and non-transitory computer-readable medium described herein, the UE receive panel ID report indicates one or more simultaneously receivable control resource set groups, where the one or more simultaneously receivable control resource set groups includes one or more multiple control resource sets from different transmission reception points. In some examples of the method, apparatuses, and non-transitory computer-readable medium described herein, the UE receive panel ID report includes a matrix, where each entry of the matrix indicates whether two control resource sets from two transmission reception points corresponding to the entry may be a simultaneously receivable group.

Some examples of the method, apparatuses, and non-transitory computer-readable medium described herein may further include operations, features, means, or instructions for receiving an indication that the first beam and the second beam may be configured, where the first and second beam may be received based on the received indication. In some examples of the method, apparatuses, and non-transitory computer-readable medium described herein, the indication may be received in radio resource control signaling, a media access control element, or downlink control information.

Some examples of the method, apparatuses, and non-transitory computer-readable medium described herein may further include operations, features, means, or instructions for identifying one or more slots where simultaneous multiple beams may have been configured by a base station, where the first beam and second beam may be received based on the identified one or more slots. Some examples of the method, apparatuses, and non-transitory computer-readable medium described herein may further include operations, features, means, or instructions for transmitting a negative acknowledgement corresponding to an initial downlink transmission from the base station, where the one or more slots may be identified based on the transmitted negative acknowledgement.

Some examples of the method, apparatuses, and non-transitory computer-readable medium described herein may further include operations, features, means, or instructions for transmitting an acknowledgement corresponding to an initial downlink transmission, and receiving an indication of the one or more slots where simultaneous multiple beams may have been configured from the base station based on the base station missing the acknowledgement, where one or more slots where simultaneous multiple beams may have been configured may be identified based on the indication.

A method of wireless communication at a base station is described. The method may include identifying that an offset between a physical downlink control channel and a physical downlink shared channel is below a threshold, identifying a first beam for a first transmission reception point and a second beam for a second transmission reception point based on the identification that the offset is below the threshold, and scheduling a simultaneous transmission from the first transmission reception point and the second transmission reception point, where the first transmission reception point is scheduled based on the identified first beam and the second transmission reception point is scheduled based on the identified second beam.

An apparatus for wireless communication at a base station is described. The apparatus may include a processor, memory in electronic communication with the processor, and instructions stored in the memory. The instructions may be executable by the processor to cause the apparatus to identify that an offset between a physical downlink control channel and a physical downlink shared channel is below a threshold, identify a first beam for a first transmission reception point and a second beam for a second transmission reception point based on the identification that the offset is below the threshold, and schedule a simultaneous transmission from the first transmission reception point and the second transmission reception point, where the first transmission reception point is scheduled based on the identified first beam and the second transmission reception point is scheduled based on the identified second beam.

Another apparatus for wireless communication at a base station is described. The apparatus may include means for identifying that an offset between a physical downlink control channel and a physical downlink shared channel is below a threshold, identifying a first beam for a first transmission reception point and a second beam for a second transmission reception point based on the identification that the offset is below the threshold, and scheduling a simultaneous transmission from the first transmission reception point and the second transmission reception point, where the first transmission reception point is scheduled based on the identified first beam and the second transmission reception point is scheduled based on the identified second beam.

A non-transitory computer-readable medium storing code for wireless communication at a base station is described. The code may include instructions executable by a processor to identify that an offset between a physical downlink control channel and a physical downlink shared channel is below a threshold, identify a first beam for a first transmission reception point and a second beam for a second transmission reception point based on the identification that the offset is below the threshold, and schedule a simultaneous transmission from the first transmission reception point and the second transmission reception point, where the first transmission reception point is scheduled based on the identified first beam and the second transmission reception point is scheduled based on the identified second beam.

Some examples of the method, apparatuses, and non-transitory computer-readable medium described herein may further include operations, features, means, or instructions for identifying a configuration of one or more control resource sets for a UE to monitor in a slot, and transmitting an indication of the configuration to the UE. Some examples of the method, apparatuses, and non-transitory computer-readable medium described herein may further include operations, features, means, or instructions for identifying a subset of the one or more control resource sets for UE determination of a set of beamforming parameters for receiving the first beam, the second beam, or both, and transmitting an indication of the subset of the one or more control resource sets to the UE. In some examples of the method, apparatuses, and non-transitory computer-readable medium described herein, the subset of the one or more control resource sets includes one or more single transmission reception point control resource sets, one or more multiple transmission reception point control resource sets, or some combination thereof.

In some examples of the method, apparatuses, and non-transitory computer-readable medium described herein, the indication of the subset of the one or more control resource sets may be transmitted in radio resource control signaling, a media access control element, or downlink control information. In some examples of the method, apparatuses, and non-transitory computer-readable medium described herein, the subset of the one or more control resource sets includes both one or more single transmission reception point control resource sets and one or more multiple transmission reception point control resource sets.

Some examples of the method, apparatuses, and non-transitory computer-readable medium described herein may further include operations, features, means, or instructions for identifying a first single transmission reception point transmission configuration indicator state for the first transmission reception point and a second single transmission reception point transmission configuration indicator state for the second transmission reception point, where a control resource set corresponding to a lowest control resource set identifier of the subset of the one or more control resource sets may be based on the identified first single transmission reception point transmission configuration indicator state and the identified second single transmission reception point transmission configuration indicator state.

In some examples of the method, apparatuses, and non-transitory computer-readable medium described herein, the subset of the one or more control resource sets includes one or more multiple transmission reception point control resource sets. In some examples of the method, apparatuses, and non-transitory computer-readable medium described herein, the first beam and the second beam may be associated with a first control resource set of the subset of the one or more control resource sets, the first control resource set corresponding to a lowest control resource set. In some examples of the method, apparatuses, and non-transitory computer-readable medium described herein, the first transmission reception point and the second transmission reception point may be scheduled to simultaneously transmit in parallel during a first symbol.

In some examples of the method, apparatuses, and non-transitory computer-readable medium described herein, the first transmission reception point and may be scheduled to transmit during a first symbol and the second transmission reception point and may be scheduled to transmit during a second symbol. Some examples of the method, apparatuses, and non-transitory computer-readable medium described herein may further include operations, features, means, or instructions for receiving a UE receive panel ID report indicating one or more pairs of beams that can be received by the UE simultaneously, where each beams of each of the one or more pairs of beams corresponds to different UE receive panels.

In some examples of the method, apparatuses, and non-transitory computer-readable medium described herein, the UE receive panel ID report indicates one or more simultaneously receivable control resource set groups, where the one or more simultaneously receivable control resource set groups includes one or more multiple control resource sets from different transmission reception points. In some examples of the method, apparatuses, and non-transitory computer-readable medium described herein, the UE receive panel ID report includes a matrix, where each entry of the matrix indicates whether two control resource sets from two transmission reception points corresponding to the entry may be a simultaneously receivable group.

Some examples of the method, apparatuses, and non-transitory computer-readable medium described herein may further include operations, features, means, or instructions for transmitting an indication that the first beam and the second beam may be configured, where the simultaneous transmission from the first transmission reception point and the second transmission reception point may be scheduled based on the transmitted indication. In some examples of the method, apparatuses, and non-transitory computer-readable medium described herein, the indication may be transmitted in radio resource control signaling, a media access control element, or downlink control information.

Some examples of the method, apparatuses, and non-transitory computer-readable medium described herein may further include operations, features, means, or instructions for configuring one or more slots for simultaneous multiple beams, where the simultaneous transmission from the first transmission reception point and the second transmission reception point may be scheduled based on the identified one or more slots.

Some examples of the method, apparatuses, and non-transitory computer-readable medium described herein may further include operations, features, means, or instructions for receiving, from a UE, a negative acknowledgement corresponding to an initial downlink transmission from the base station, where the one or more slots may be configured based on the received negative acknowledgement. Some examples of the method, apparatuses, and non-transitory computer-readable medium described herein may further include operations, features, means, or instructions for transmitting an indication of the one or more slots where simultaneous multiple beams may have been configured based on missing an expected acknowledgement from a UE.

DETAILED DESCRIPTION

Figure 1:
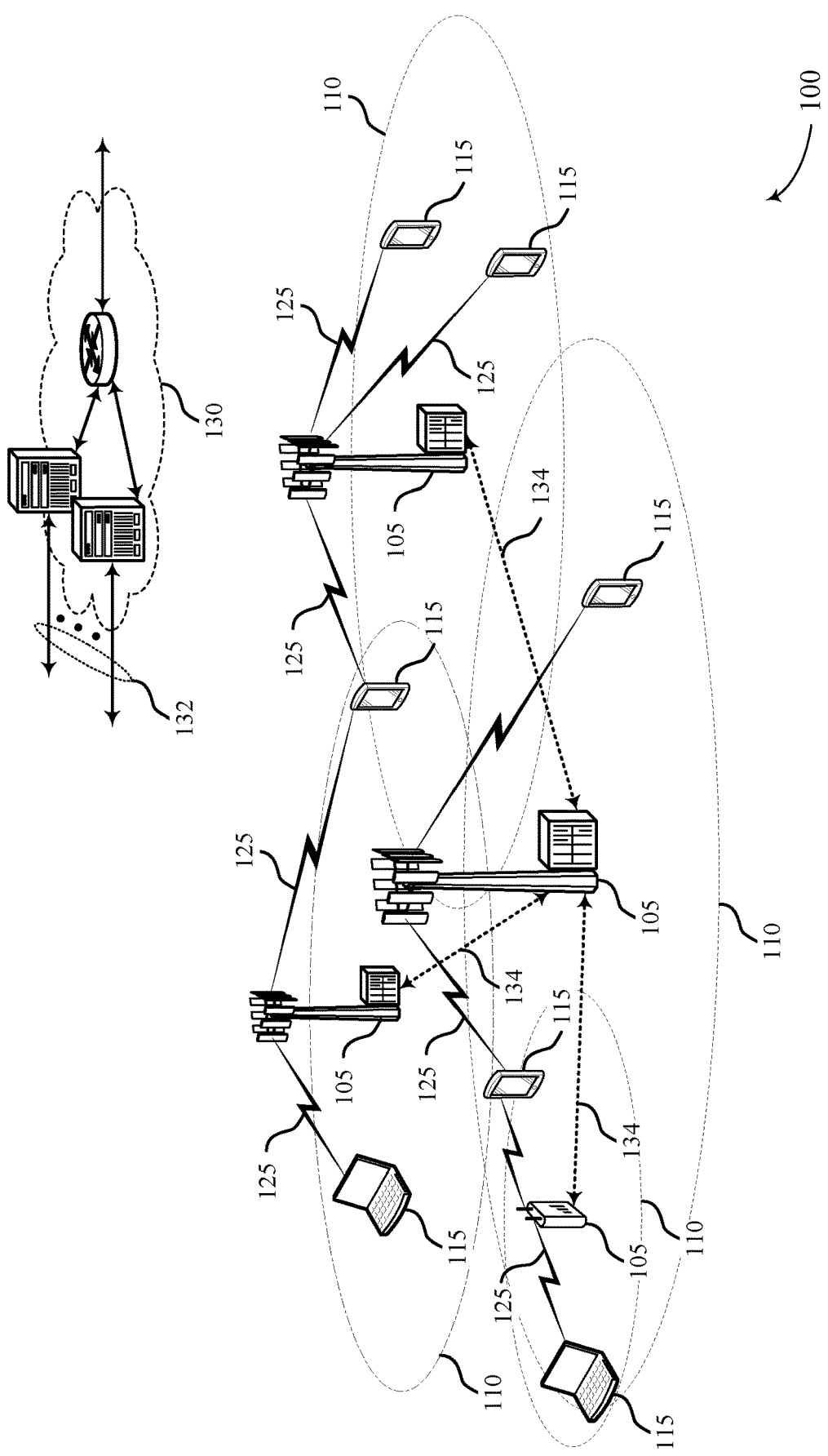
FIG. 1 illustrates an example of a system for wireless communications that supports simultaneous multiple default beams in accordance with aspects of the present disclosure.

A user equipment (UE) may receive a physical downlink control channel (PDCCH) transmission from a base station that includes control information for decoding a subsequent physical downlink shared channel (PDSCH) transmission from the base station. The UE may decode control information in the PDCCH before receiving the PDSCH transmission and use the control information to configure one or more parameters for receiving and/or decoding the PDSCH transmission. In some cases, the base station may send the PDSCH transmission close in time to or overlapping with the PDCCH transmission. If the offset between the PDCCH transmission and the PDSCH transmission is below a time threshold, the UE may not be able to decode to control information in the PDCCH with enough time to configure receive parameters used to receive and decode the PDSCH transmission. Accordingly, the UE and base station may configure a default receive beam for buffering the PDSCH transmission while the UE receives and decodes the PDCCH control information. However, in cases where the UE has established communication links with multiple transmission reception points (TRPs), the UE may buffer a PDSCH over a single default receive beam when the timing offset of the PDCCH transmissions and PDSCH transmission are below the threshold.

According to the techniques described herein, a base station or UE may configure additional default beams for a UE to simultaneously buffer multiple PDSCH transmissions from multiple TRPs. The UE may receive a first beam from a first TRP using a first set of beamforming parameters and a second beam from a second TRP using a second set of beamforming parameters. The UE may buffer a first downlink transmission from the first TRP and a second downlink transmission from the second TRP and decode the buffered first and second set of downlink transmissions.

In some cases, configuring additional default beams may include using a multiple TRP control resource set (CORESET) with a transmission control indicator (TCI) state or beam indications that consist of multiple single TRP TCI states. In these examples, the multiple default receive beams may be derived from quasi colocation (QCL) information of the multiple TRP CORESET. In further cases, each TRP may be configured with a default beam configuration. The UE may determine the default receive beam parameter for each of the TRPs based on monitoring the TRP's CORESETs, for example, in the latest slot. The UE may simultaneously receive a first downlink transmission from a first TRP and a second downlink transmission from a second TRP using the configured default receive beams. In further cases, simultaneous default receive beams can be explicitly configured. For example, the base station can transmit a default beam configuration for a first TRP and a default beam configuration for a second TRP to the UE. In some cases, a UE may use multiple default receive beams for each slot in a PDSCH transmission. In other cases, a UE may selectively use multiple default receive beams for a subset of slots in a PDSCH transmission.

Aspects of the disclosure are initially described in the context of a wireless communications system. Aspects of the disclosure are then described in the context of communications systems and frame configurations that relate to simultaneous multiple default beams. Aspects of the disclosure are further illustrated by and described with reference to apparatus diagrams, system diagrams, and flowcharts that relate to simultaneous multiple default beams.

FIG. 1 illustrates an example of a wireless communications system 100 that supports simultaneous multiple default beams in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a UE 115 may establish communications links with one or more transmission reception points (TRPs), which may include using directional beams. For example, a UE 115 may communicate with a first TRP using a first set of directional beams and communicate with a second TRP using a second set of directional beams. A UE 115 may receive control information over a physical downlink control channel (PDCCH), which may include downlink control information (DCI) that may be decoded by a UE 115 and used to determine a receive beam configuration for receiving a physical downlink shared channel (PDSCH). In some cases, the receive beam configuration may include one or more beamforming parameters for receiving one or more directional beams from multiple transmission reception points (TRPs). In some cases, the PDCCH transmission may be received by a UE 115 at an offset threshold (time offset) after receiving the PDCCH transmission, which may allow the UE 115 to decode the DCI and configure receive beams for receiving the PDSCH transmission from one or more TRPs.

In some cases, it may be desirable for the UE 115 to receive information via the PDCCH followed by receiving communications via the PDSCH in a shorter amount of time than the threshold offset. For example, this may increase transmission frequency or reduce latency of communications between the UE 115 and TRPs. In some cases, TRPs may transmit and a UE 115 may receive using default PDSCH beams. For example, a UE 115 may simultaneously receive PDSCH transmissions from multiple TRPs. The UE 115 may configure default PDSCH receive beams based on the default configuration without first needing to decode control information (e.g., DCI) transmitted via a PDCCH. Further, in cases where the time offset between PDCCH and PDSCH communication are less than the threshold offset time, a UE 115 may use the one or more default PDSCH beams to buffer the PDSCH transmission from multiple TRPs until the PDDCH transmission (e.g., including DCI) can be received and decoded. Accordingly, TRPs and UEs 115 may configure one or more default PDDCH beams for simultaneously buffering PDDCH transmissions over beamformed communication links.

Figure 2:
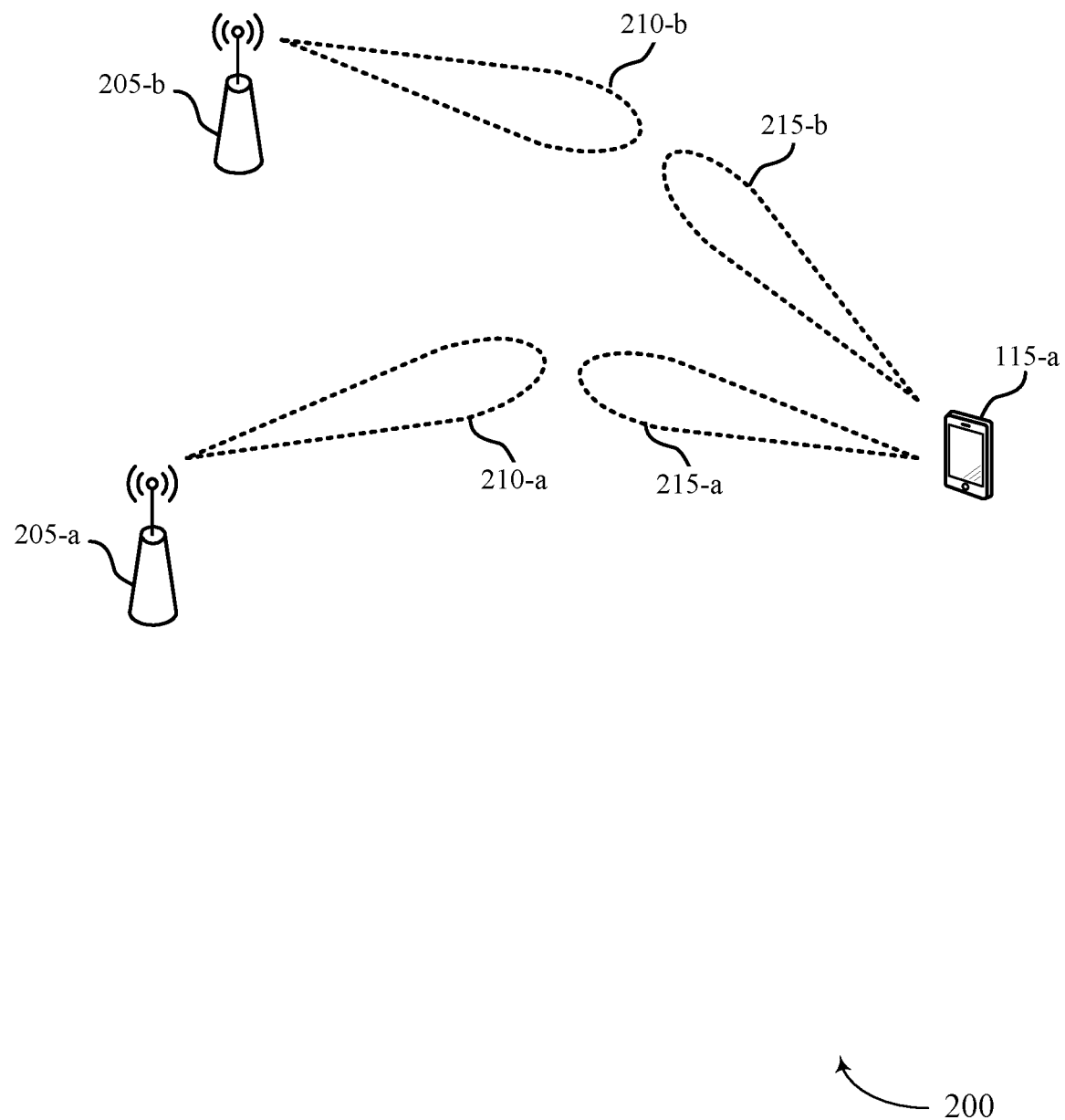
FIG. 2 illustrates an example of a wireless communications system that supports simultaneous multiple default beams in accordance with aspects of the present disclosure.

FIG. 2 illustrates an example of a wireless communications system 200 that supports simultaneous multiple default beams in accordance with aspects of the present disclosure. In some examples, the wireless communications system 200 may implement aspects of wireless communication system 100. The wireless communications system 200 may include a first TRP 205-a, second TRP 205-b and a UE 115-a, which may be an example of UEs 115 described with reference to FIG. 1. The wireless communications system 200 may provide an example of TRPs 205 transmitting using multiple default PDSCH transmit beams 210 and the UE 115-a receiving the communications using multiple default receive beams 215.

In some cases, the UE 115-a may configure default receive beams to simultaneously buffer multiple PDSCH transmissions from multiple TRPs 205. For example, the first TRP 205-a may transmit data over a first PDCCH transmit beam 210-a and the UE 115-a may receive the data over a first default receive beam 215-a. A second TRP 205-b may transmit data over a second PDCCH transmit beam 210-b and the UE 115-a may receive the data over a second default receive beam 215-b. In some cases, the default receive beams 215 may be derived from quasi co-location (QCL) information associated with one or more control resources sets (CORESETs). For example, the UE 115-a may be configured with a multiple TRP CORESET that includes transmission configuration indication (TCI) states or beam indications consisting of more than one single TRP state (e.g., each single TRP state corresponding to beamformed pair, such as 210-a and 215-a or 210-b and 215-b).

In some examples, the multiple TRP CORESET is a CORESET that has dedicated time and frequency resources and is monitored by the UE 115-a. In these cases, the UE 115-a may receive the multiple TRP CORESET and determine the multiple single TRP states for configuring the default receive beams 215. In some examples, the multiple CORESET may be a virtual CORESET configured at the UE 115-a and referring to beam indications for the default receive beams 215. In some cases, the virtual CORESETs may not be monitored by the UE 115-a. In other cases, the multiple TRP CORESET may refer to multiple single TRP CORESETs, which may include CORESETs that overlap in time and frequency.

In some cases, the UE 115-*a* may derive the default receive beams 215 from the QCL of the multiple TRP CORESET based on the lowest identification (ID) CORESET in the received slots. For example, a UE may determine that a number of demodulation reference signal (DMRS) ports of a PDSCH transmission of a serving cell are QCL with the reference signals with respect to the QCL parameters associated with the TCI states corresponding to the lowest codepoint among TCI codepoints containing two different TCI states. The UE 115-*a* may derive the default receive beams 215 based on how the multiple TRP CORESET is configured. For example, if the UE 115-*a* monitors for the multiple TRP CORESET, the UE 115-*a* may derive the QCL from the CORESET with the lowest ID in the latest measured slot. In examples where the a virtual CORESET is configured, the UE 115-*a* may derive the QCL from a virtual search space.

Determining the lowest CORESET ID for the default receive beam may be performed in a variety of ways. For example, in a first mode, a default receive beam 215-*a* or 215-*b* may be configured as a single default beam, and the lowest ID may be selected from all or a subset of single TRP CORESETs. In this mode, the default beam with be single default receive beam 215-*a* or 215-*b* for receiving data over the PDSCH. Another example may include a second mode where multiple simultaneous default receive beams 215 may be configured as multiple default beams, and the lowest ID may be selected from all or a subset of multiple TRP CORESETs. In the second mode, the TCI state corresponding to the multiple TRP CORESETs may include multiple single TRP TCI states. Accordingly, the default beam may have multiple default receive beams (e.g., 215-*a* and 215-*b*) for receiving transmission beams 210 from multiple TRPs (e.g., 205-*a* and 205-*b*). Another example may include a third mode where simultaneous single default beams or multiple default receive beams 215 may be configured and the lowest ID may be selected from single TRP CORESETS, multiple TRP CORESETS or a combination thereof. Accordingly, the default beams may have a mix of single and multiple default receive beams (e.g., default receive beams 215) for receiving data via a PDSCH transmission.

In some cases, the set of CORESETs for determining the lowest ID may be configured statically by configuring the UE 115-*a* and TRPs 205 or dynamically, such as by signaling the configuration using a radio resource control (RRC), media access layer (MAC) control element (CE), DCI information or a combination thereof. In some examples, the method used to determine the lowest CORESET ID may identify a corresponding mode (e.g., mode one, mode two or mode three). For example, if the UE 115-*a* is configured to determine the lowest ID using single TRP CORESETs, then the UE 115-*a* may determine that the default receive beam is a single TRP beam (e.g., default receive beam 215-*a* or 215-*b*). If the UE 115-*a* is configured to determine the lowest ID using multiple TRP CORESETS then the UE 115-*a* may determine that multiple default receive beams may be used (e.g., default receive beams 215-*a* and 215-*b*). If the UE 115-*a* is configured to determine the lowest ID using single TRP CORESETs or multiple TRP CORESETs then the UE 115-*a* may determine that both single and multiple default receive beams may be used.

In some cases, each TRP 205 may transmit on the same multiple TRP CORESETs using two PDDCH transmissions. In some examples, both PDDCHs may have overlapping frequency resources in the multiple TRP CORESETs. In other cases, the two PDDCHs may have non-overlapping frequency resources in the multiple TRP CORESETs. Examples also include the two PDDCHs having the same or different payloads.

In some cases, when determining the lowest ID among the TRP CORESETs (e.g., either multiple TRP CORESETs or single TRP CORESETs) the subset can exclude CORESET 0 from the lowest ID selection. This may be desirable if CORESET 0 is used for broadcast or multicast transmission such as PDCCH transmissions.

Figure 3A:
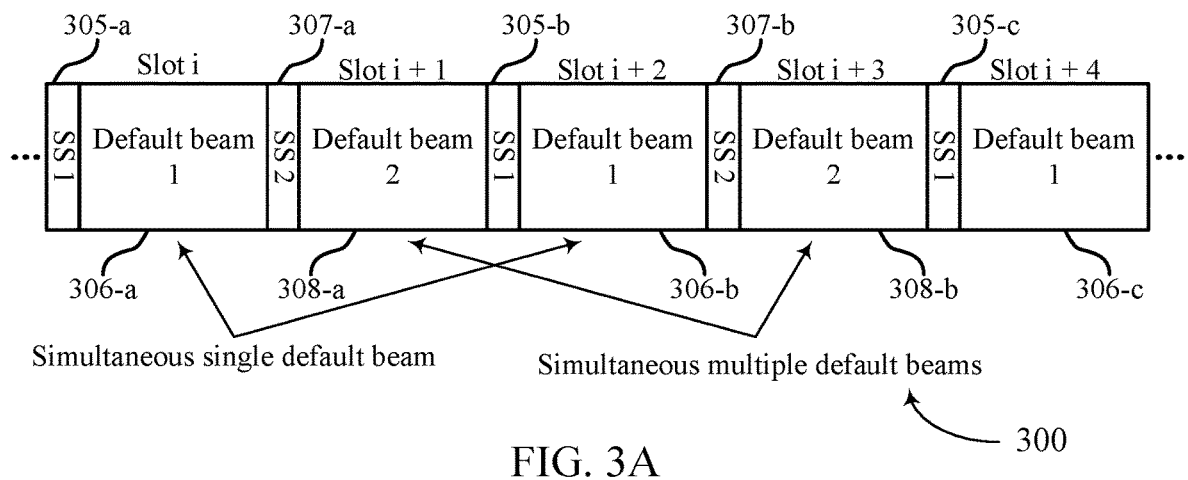
FIGS. 3A-3C illustrate examples of a frame structures that supports simultaneous multiple default beams in accordance with aspects of the present disclosure.

FIG. 3A illustrates an example of a first frame configuration 300 for single TRP or multiple TRP CORESETS that supports simultaneous multiple default beams in accordance with aspects of the present disclosure. In some examples, first frame configuration 300 may implement aspects of wireless communication systems 100 or 200. The first frame configuration 300 may include multiple slots (e.g., Slot i-Slot i+4), where a first set of slots 306 (e.g., Slot i, Slot i+2, Slot i+4, etc.) are associated with a first CORESET and a second set of slots 308 (e.g., Slot i+1, Slot i+3, etc.) are associated with a second CORESET, which may be examples of CORESETs discussed in relations to FIG. 2.

In some cases, a first set of search spaces 305 (e.g., SS1) may be associated with a first CORESET ID, which may indicate a single TRP CORESET. In this regard, the single TRP CORESET may include a single TRP TCI state from a first TRP. Accordingly, a first set of slots 306 may be associated with a single TRP beam (e.g., default beam 1). For example, a UE may buffer a PDSCH transmission using a single default receive beam. A second set of search spaces 307 (e.g., SS2) may be associated with a second CORESET ID, which may indicate a multiple TRP CORESET. In this regard, the multiple TRP CORESET may include a TRP TCI state from a first TRP and a second TRP (e.g., two single TRP TCI states). Accordingly, a second set of slots 308 may be associated with a multiple TRP beams (e.g., first and second default beams). For example, a UE may buffer a PDSCH transmission using multiple default receive beams, where each default receive beam is associated with a different TRP.

Figure 3B:
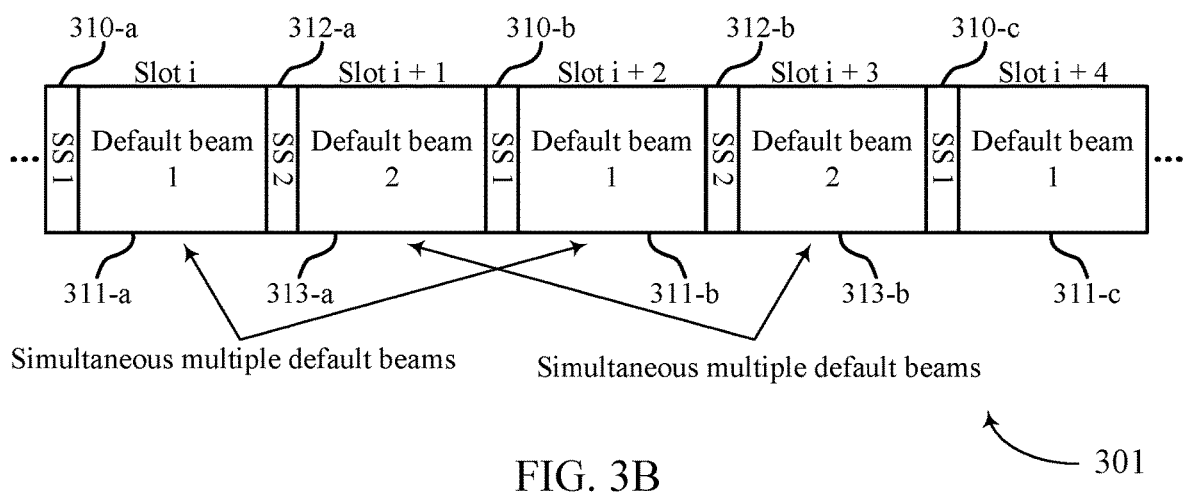

FIG. 3B illustrates an example of a second frame configuration 301 for multiple TRP CORESETs that supports simultaneous multiple default beams in accordance with aspects of the present disclosure. In some examples, second frame configuration 301 may implement aspects of wireless communications systems 100 and 200. The second frame configuration 301 may include multiple slots (e.g., Slot i-Slot i+4), where a first set of slots 311 (e.g., Slot i, Slot i+2, Slot i+4, etc.) are associated with a first CORESET and a second set of slots 313 (e.g., Slot i+1, Slot i+3, etc.) are associated with a second CORESET, which may be examples of CORESETs discussed in relations to FIGS. 2 and 3A.

In some cases, a first set of search spaces 310 (e.g., SS1) may be associated with a first CORESET ID, which may indicate a multiple TRP CORESET. In this regard, the multiple TRP CORESET may include a multiple TRP TCI state from a first TRP and a second TRP (e.g., two single TRP TCI states). In some cases, the TCI state of CORESET 1 for the first search spaces 310 (e.g., SS1) may be reselected by a MAC-CE to be a multiple TRP TCI state to include two single TRP TCI states. Accordingly, a first set of slots 311 may be associated with a first set of multiple TRP beams (e.g., a first and second default beam). For example, a UE may buffer a PDSCH transmission using multiple default receive beams. A second set of search spaces 312 (e.g., SS2)

may be associated with a second CORESET ID, which may indicate a multiple TRP CORESET. In this regard, the multiple TRP CORESET may include a TRP TCI state from a first TRP and a second TRP (e.g., two single TRP TCI states). Accordingly, a second set of slots 311 may be associated with a second set of multiple TRP beams (e.g., a first and second default beam). For example, a UE may buffer a PDSCH transmission using multiple default receive beams, for example, each default receive beam associated with a different TRP. In some cases, the first set of multiple TRP beams may be the same or different from the second set of multiple TRP beams.

Figure 3C:
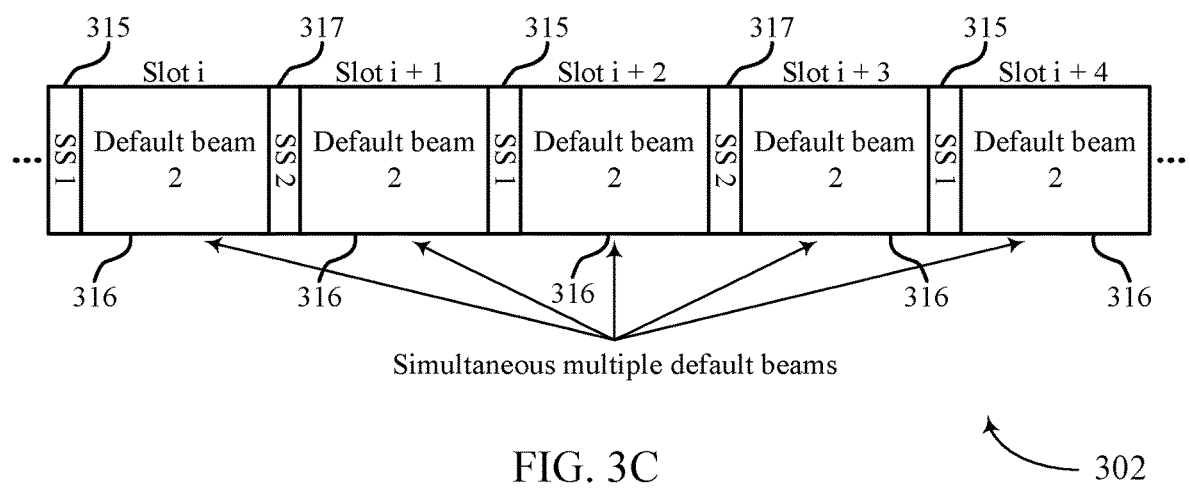

FIG. 3C illustrates an example of a third frame configuration 302 for multiple TRP CORESETs that supports simultaneous multiple default beams in accordance with aspects of the present disclosure. In some examples, third frame configuration 302 may implement aspects of wireless communications systems 100 and 200. The third frame configuration 302 may include multiple slots 316 (e.g., Slot i-Slot i+4), that are associated with a first CORESET, which may be examples of CORESETs discussed in relation to FIGS. 2, 3A, and 3B.

In some cases, multiple TRP beams can be achieved by restricting the lowest ID within all the multiple TRP CORESETS. This restriction may be dynamically signaled, for example, via a DCI, MAC-CE, RRC transmission or the like. In some examples a UE may ignore the first search space CORESET (e.g., SS1), and implement a multiple TRP CORESET. In this regard, the multiple TRP CORESET may include a multiple TRP TCI state from a first TRP and a second TRP (e.g., two single TRP TCI states). In some cases, the TCI state of CORESET 1 for the first search spaces 315 (e.g., SS1) may be based on last slot (e.g., SS2 CORESET). Accordingly, the slots 316 associated with the first set of search spaces 315 may be associated with a first set of multiple TRP beams (e.g., a first and second default beam). For example, a UE may buffer a PDSCH transmission using multiple default receive beams.

A second set of search spaces 317 (e.g., SS2) may be associated with a second CORESET ID, which may indicate a multiple TRP CORESET. In this regard, the multiple TRP CORESET may include a TRP TCI state from a first TRP and a second TRP (e.g., two single TRP TCI states). Accordingly, the slots 316 associated with the second set of search spaces 317 may be associated with a second set of multiple TRP beams (e.g., a first and second default beam). For example, a UE may buffer a PDSCH transmission using multiple default receive beams, for example, each default receive beam associated with a different TRP. In some cases, the first set of multiple TRP beams may be the same as the second set of multiple TRP beams.

In some cases, a TCI state ID can be mapped to multiple single TRP TCI states and may become a multiple TRP TCI state. This mapping may be accomplished via RRC signaling, can be dynamically accomplished using a MAC-CE or DCI to save the RRC reconfiguration. In some examples, a multiple TRP TCI state may be formed and applied to a CORESET, which then becomes a multiple TRP CORESET.

In some cases, a UE may be configured by higher layer parameter (e.g., PDCCH-Config) that contains two different values of a CORESET index value (e.g., CORESETPoolIndex) for the CORESET. In such cases, when various parameters are enabled (e.g., tci-PresentInDCI) and tci-PresentInDCI is not configured in RRC connected mode, and if the offset between the reception of the downlink DCI and the corresponding PDSCH is less than the threshold time duration (e.g., timeDurationForQCL), the UE may determine that the DM-RS ports of PDSCH associated with a value of the CORESET index value of a serving cell are QCL with certain reference signals. For example, the CORESETPoolIndex may be QCL with the reference signals with respect to one or more QCL parameters used for PDCCH QCL indication of the CORESET associated with a monitored search space corresponding to the lowest CORESET ID among CORESETs.

In some examples, the CORESET associated with the lowest CORESET ID may be configured with the same value of CORESETPoolIndex as the PDCCH scheduling the corresponding PDSCH. The PDSCH may also be scheduled in the latest slot in which one or more CORESETs associated with the same value of CORESETPoolIndex as the PDCCH scheduling that PDSCH within the active bandwidth part (BWP) of the serving cell are monitored by the UE.

Figure 4:
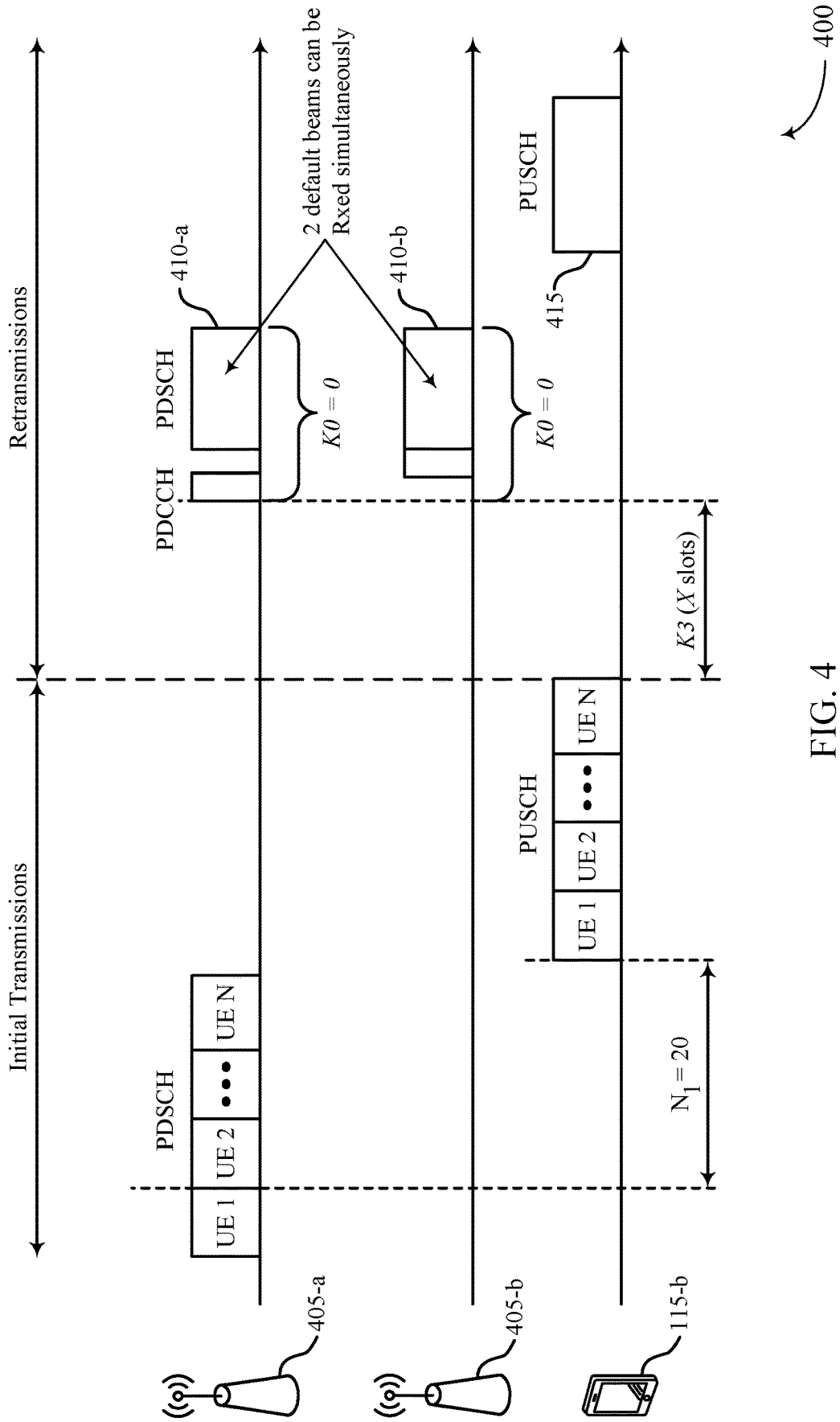
FIG. 4 illustrates an example of a wireless communications system that supports simultaneous multiple default beams in accordance with aspects of the present disclosure.

FIG. 4 illustrates an example of a wireless communications system 400 that supports simultaneous multiple default beams in accordance with aspects of the present disclosure. In some examples, the wireless communications system 400 may implement aspects of wireless communications systems 100 or 200. The wireless communications system 400 may include a UE 115-b, which may be an example of UEs 115 described with reference to FIGS. 1-3; and first and second TRPs 405, which may be examples of TRPs discussed with regard to FIGS. 2-3. The system 400 may include an example of the UE 115-6 buffering one or more PDSCH signals using multiple default TRP beams from a first TRP 405-a and a second TRP 405-b. In some cases, the buffering may occur when a time offset between the PDCCH and the PDSCH is less than threshold, for example, requiring the UE 115-b to buffer the PDSCH, while decoding the PDCCH.

In some cases, each TRP 405 may have its own default beam, which may include each TRPs 405 CORESET being a single TRP CORESET. In this regard, symbols from both the first TRP 405-a and the second TRP 405-b can be received simultaneously, and a first PDSCH transmission 410-a and a second PDSCH transmission 410-b scheduled on those symbols may be received by the UE 115-b simultaneously. In some cases, the UE 115-b will buffer data using a first default beam for a the first PDSCH transmission 410-a transmitted on a first symbol and buffer data using a second default beam for a second PDSCH transmission 410-b transmitted on a second simultaneous symbol. In some cases, simultaneously buffering data on multiple default beams may depend on a capability of the UE 115-b. For example, in cases where a base station or gNB determines that the UE 115-b can receive multiple simultaneous TRP signals, the gNB may use both TRPs 405 to transmit PDSCH data 410 and the UE 115-a may buffer the PDSCH transmission using two default beams. In some cases, the gNB may determine that the UE 115-b cannot receive multiple simultaneous TRP signals, and the gNB may only use a single TRP 405-a or TRP 405-b to transmit PDSCH data 410-a or 410-b, which may be received by the UE 115-a using a single default beam.

In some cases, determining the default receive beam for each TRP 405 may include determining the CORESET with the lowest ID in each TRPs 405 CORESET in the latest monitored slot for each TRP 405. Accordingly, each unscheduled downlink symbol may have two default beams for the two TRPs. In some examples, on each unscheduled downlink symbol and if the UE 115-b can simultaneously receive default beams from both TRPs 405, the UE 115-b may use both/multiple default beams to buffer downlink data. For example, two PDSCH transmissions can be scheduled on each symbol. In further examples, the UE 115-b may use one default beam to buffer downlink data based on one or more priority rules. For example, the UE 115-*b* may use a default beam for a TRP 405 with a lower ID, a default beam determined by CORESET with a lower ID, or a combination thereof.

A base station (e.g., gNB) or UE 115-*b* may determine that multiple different TRP beams can be received by the UE 115-*b* in a variety of ways. In some cases, the base station and UE 115-*a* may determine whether multiple default beams can be received simultaneously based on the UE 115-*b* panel ID report. For example, the base station may determine that the UE 115-*b* can simultaneously receive multiple default beams if they correspond to different UE 115-*b* receive panels. In these cases, the UE 115-*a* may report a receive panel ID for each CORESET TCI state from each TRP 405, which may be done via reporting level 1 (L1) RSRP, a panel index for a given downlink beam or resource set, or a combination thereof. Both the UE 115-*b* and base station may know that the UE 115-*b* may receive a panel ID for each receive beam for each CORESET of each TRP 405. Accordingly, both the UE 115-*b* and base station may determine that the UE 115-*b* receives a panel ID for a default beam for each TRP 405 at each time and determine that multiple default beams can be received simultaneously.

In further cases, the base station and UE 115-*a* may determine whether multiple default beams can be received simultaneously based on whether the UE 115-*b* reports on whether multiple TRP 405 CORESETs can be received simultaneously. For example, each TRP 405 may include three CORESETs and the UE 115-*b* may report a three-by-three matrix with each entry indicating a "1" indicating that the corresponding CORESETs from the two TRPs 405 and corresponding default beams from each TRP 405 may be simultaneously received. In further examples, the UE 115-*b* may report CORESET groups individually, which may include each row in a table corresponding to one CORESET group. As such, a first row may include an indication for a first CORESET from the first TRP 405-*a* and a second CORESET from the second TRP 405-*a* indicating that both CORESET can be received by the UE 115-*b* simultaneously.

In some cases, the UE 115-*a* can be explicitly configured to receive multiple default beams for multiple TRPs (e.g., TRPs 405), which may include using RRC signaling, MAC-CE, DCI information, or the like, or a combination thereof. For example, a base station may identify two default beams (e.g., for TRPs 405) using two single TRP TCI states that are received by the UE 115-*b* simultaneously. The UE 115-*b* may apply the two default beams on each unscheduled downlink symbol.

Figure 5:
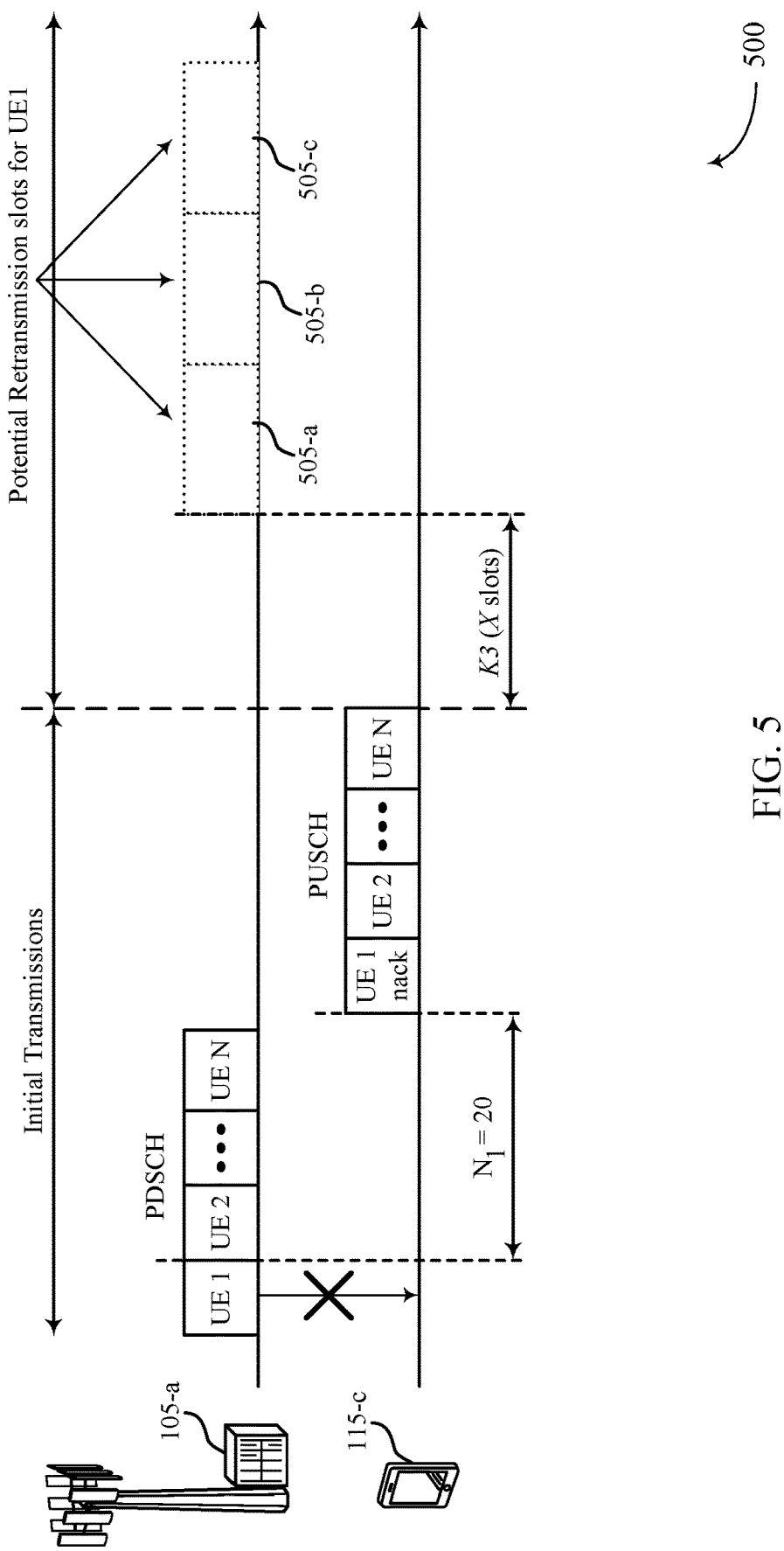
FIG. 5 illustrates an example of a wireless communications system that supports simultaneous multiple default beams in accordance with aspects of the present disclosure.

FIG. 5 illustrates an example of a wireless communications system 500 that supports simultaneous multiple default beams in accordance with aspects of the present disclosure. In some examples, the wireless communications system 500 may implement aspects of wireless communications systems 100, 200, and 400 or frame configurations 300, 301 and 302. The wireless communications system 500 may include a base station 105-*a*, which may be an example of base stations 105 discussed with reference to FIG. 1; and a UE 115-*c*, which may be an example of UEs discussed with reference to FIGS. 1-4. The wireless communications system 500 provides examples of cases where the UE 115-*c* may selectively apply multiple default beam configurations to different slots of transmission from the base station 105-*a*.

In some cases, multiple default beam communications may be selectively configured by the base station 105-*a* at the UE 115-*c* or TRPs. This may include applying one or more multiple beam configuration described herein on a slot by slot basis. In some cases, selectively configuring multiple TRPs may be implemented on a usage or need basis, for example when the UE 115-*c* has higher downlink traffic. In this regard, the second or other TRPs may remain free when not performing multiple default beams configurations to provide resources for other UEs served by the base station 105-*a*.

In a first set of examples, where multiple TRP CORESETs are configured (e.g., as discussed in relation to FIGS. 2 and 3, the base station 105-*a* may configure multiple TRP CORESETs for a subset of slots 505 of a frame. In some cases, the rest of the slots may be configured with a single default receive beam for the UE 115-*c* to receive PDSCH transmissions. In a second set of examples, where a single default beam for each TRP is configured (e.g., as discussed in relation to FIG. 4) the base station 105-*a* may configure single TRP CORESETs for each TRP in each of the slots 505 of a frame. In some cases, the rest of the slots may be configured with a single default receive beam for the UE 115-*c* to receive PDSCH transmissions. In some examples, the slots 505 may be configured as potential retransmission slots. For example, if a transmission from the base station 105-*a* to the first UE 115-*c* fails, the first UE 115-*a* may transmit a negative acknowledgement (NACK) to the base station 105-*a* during an initial transmission period. In response, the base station 105-*a* may configure one or more slots (e.g., slots 505) as multiple default beam slots for receiving retransmission of the PDSCH from the base station 105-*c* to the first UE 115-*c* via one or more TRPs, which may also reduce the use of secondary TRP transmissions to the a UE (e.g., the first UE 115-*c*).

Figure 6:
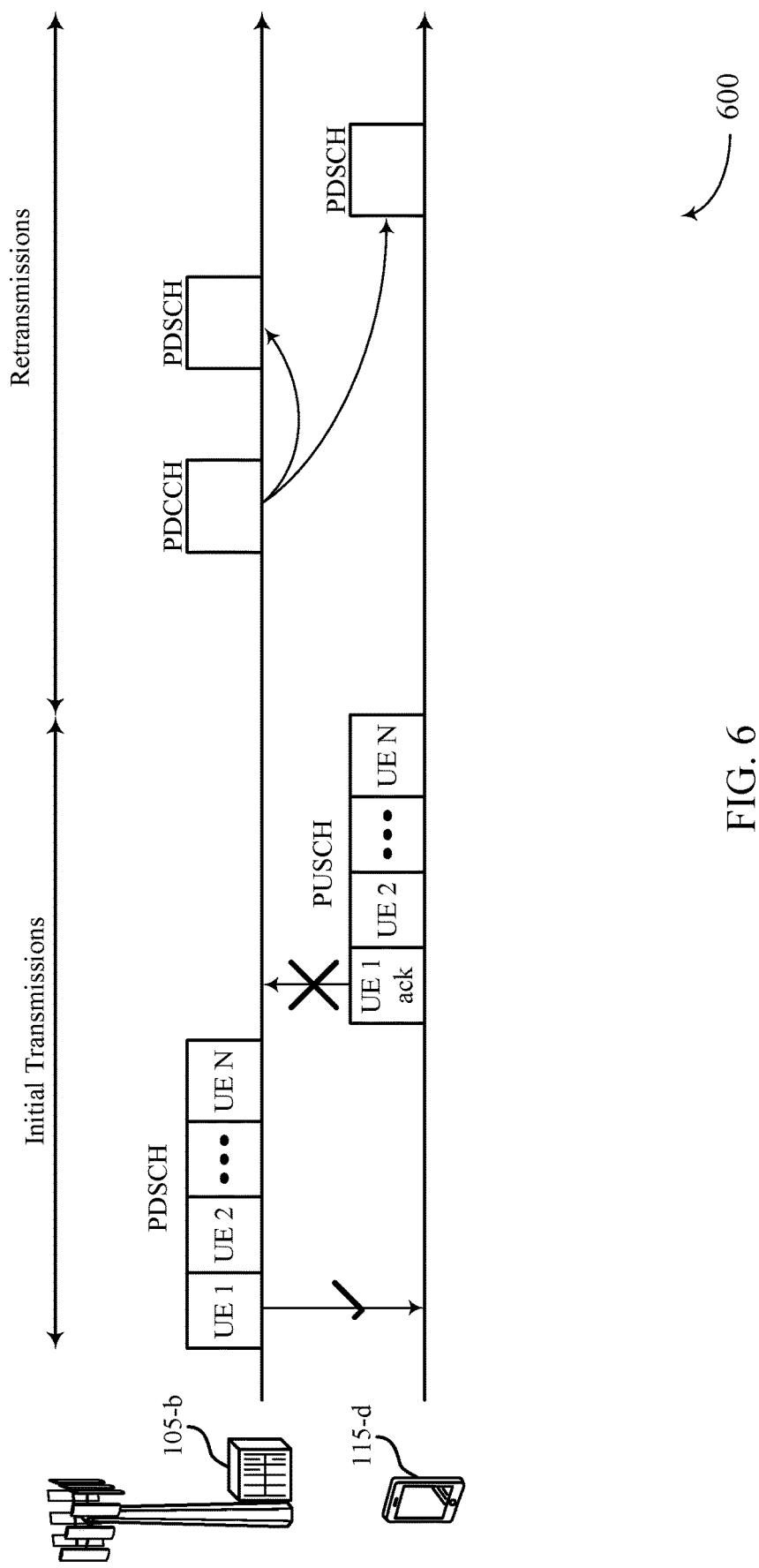
FIG. 6 illustrates an example of a wireless communications system that supports simultaneous multiple default beams in accordance with aspects of the present disclosure.

FIG. 6 illustrates an example of a wireless communications system 600 that supports simultaneous multiple default beams in accordance with aspects of the present disclosure. In some examples, the wireless communications system 600 may implement aspects of wireless communications systems 100, 200, 400 and 500 or frame configurations 300, 301 and 302. The communications system 600 may include a base station 105-*b*, which may be an example of base stations 105 discussed with reference to FIGS. 1 and 5; and a UE 115-*d*, which may be an example of UEs discussed with reference to FIGS. 1-5. The wireless communications system 600 provides examples of cases where the base station 105-*b* or the UE 115-*d* may selectively activate multiple default beam transmission in response to one or more transmission link failures.

In some cases, the UE 115-*d* may activate multiple default receive beams for receiving PDSCH transmissions using multiple beams from multiple TRPs if a NACK is sent from an initial downlink transmission. In other examples, the base station 105-*b* may activate multiple default beam configurations if it receives a NACK or a corresponding uplink transmission from the UE 115-*d* that is not decoded for an initial downlink transmission. In some cases, the activation of multiple default beam transmission may become misaligned. For example, if the UE 115-*d* receives an initial transmission from the base station 105-*b* and sends an ACK, the base station 105-*b* may not decode the corresponding uplink transmission (e.g., the uplink transmission fails). In this case, the UE 115-*d* may not activate a multiple default beam configuration based on transmitting the ACK, but the base station may activate a multiple default beam configuration based on not decoding the uplink transmission. The UE 115-*d* may still monitor the search space/PDCCH, which schedules the uplink retransmission, and may activate a multiple default beam configuration based on an indication of uplink failure within the search space/PDDCH transmission. In some cases, the UE may identify or determine that that the offset is below the threshold for a symbol based on failing to identify a scheduled downlink signal known to the UE for the symbol.

Figure 7:
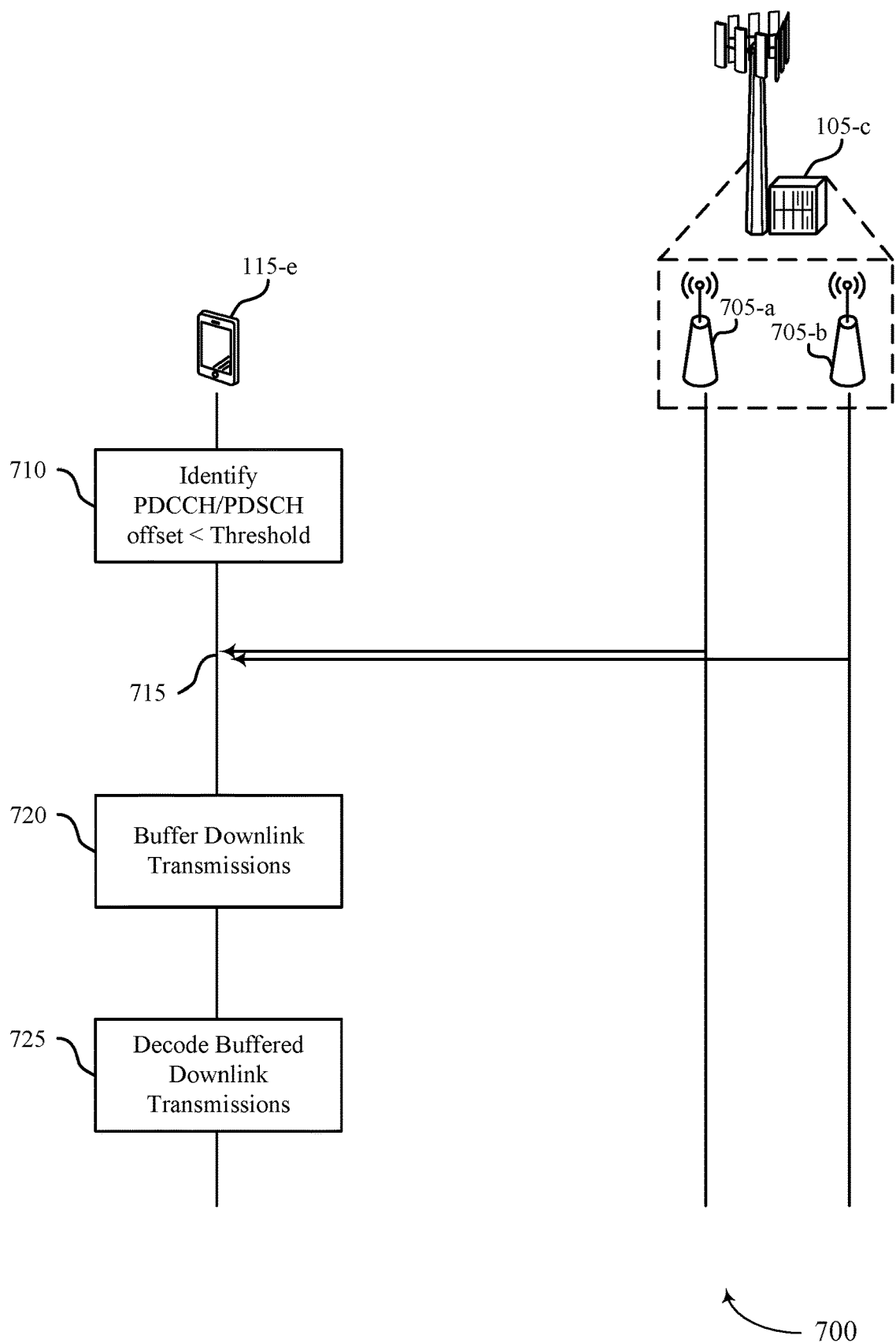
FIG. 7 illustrates an example of a process flow that supports simultaneous multiple default beams in accordance with aspects of the present disclosure.

FIG. 7 illustrates an example of a process flow 700 that supports simultaneous multiple default beams in accordance with aspects of the present disclosure. In some examples, the process flow 700 may implement aspects of wireless communications systems 100, 200, 400, 500, and 600 or frame configurations 300, 301, and 302. Process flow 700 may include UE 115-e and base station 105-c, which may be respective examples of a UE 115 and a base station 105 described herein. In the following description of the process flow 700, the operations between UE 115-e and base station 105-c may be transmitted in a different order than the order shown, or the operations performed by base station 105-c and UE 115-e may be performed in different orders or at different times. Certain operations may also be left out of the process flow 700, or other operations may be added to the process flow 700. It is to be understood that while base station 105-c and UE 115-e are shown performing a number of the operations of process flow 700, any wireless device may perform the operations shown.

For example, base station 105-c may control or configure a first TRP 705-a and a second TRP 705-b, and TRP 705-a and TRP 705-b may perform some operations on behalf of the base station 105-c. In some cases, base station 105-c may refer to TRP 705-a and TRP 705-b. As discussed herein, base station 105-c may identify that an offset between a PDCCH and a PDSCH is below a threshold (e.g., that an offset between a received PDCCH and a corresponding PDSCH is below a threshold). Base station 105-c may then identify a first beam for a first TRP (e.g., TRP 705-a) and a second beam for a second TRP (e.g., TRP 705-b) based on the identification that the offset is below the threshold, and may schedule a simultaneous transmission (e.g., in parallel during a symbol) from the TRP 705-a and the TRP 705-b (e.g., where TRP 705-a is scheduled based on the identified first beam and the TRP 705-b is scheduled based on the identified second beam.

In some examples, base station 105-c may transmit, to UE 115-e, an indication of a configuration of one or more CORESETs for UE 115-e to monitor in a slot, an indication of a subset of the one or more CORESETs for the UE to determine of a set of beamforming parameters for receiving the first beam, the second beam, or both, etc. In some cases, the subset of the one or more CORESETs may include one or more single TRP CORESETs, one or more multiple TRP CORESETs, or some combination thereof. In some cases, the indication of the subset of the one or more CORESETs may be transmitted in RRC signaling, a MAC-CE, or DCI. In some cases, the first beam and the second beam (e.g., scheduled for TRP 705-a and TRP 705-b, respectively) may be associated with a CORESET of the subset of the one or more CORESETs (e.g., where the CORESET corresponds to a lowest CORESET ID). In some cases, the first beam and the second beam may be received simultaneously at UE 115-e.

In some cases, the UE 115-e may transmit, to base station 105-c, a UE receive panel ID report indicating one or more pairs of beams that can be received by the UE 115-e simultaneously (e.g., where each beam of each of the one or more pairs of beams corresponds to different UE receive panels). In such cases, the first and second beams scheduled by the base station 105-c may be based on the UE receive panel ID report (e.g., base station 105-c may schedule TRP 705-a and TRP 705-b with beams that the UE 115-e has indicated it is capable of receiving simultaneously).

At 710, UE 115-e may that an offset between a PDCCH and a PDSCH is below a threshold (e.g., UE 115-e may receive PDCCH and identify that corresponding PDSCH is to be received according to a timing offset, from the PDCCH, that is below a threshold).

At 715, UE 115-e may receive, based on the identification that the offset is below the threshold at 710, a first beam from a TRP 705-a (e.g., using a first set of beamforming parameters) and a second beam from a TRP 705-b (e.g., using a second set of beamforming parameters). As discussed herein, in some cases, UE 115-e may identify a configuration of one or more CORESETs for the UE 115-e to monitor in a slot and determine the first set of beamforming parameters and the second set of beamforming parameters based on the identified configuration (e.g., default receive beam(s) may be derived from QCL of CORESET with lowest ID in latest slot with actual/virtual SS/CORESET). In some cases, UE 115-e may identify a subset of the one or more CORESETs and may determine, from the subset of the one or more CORESETs, a CORESET corresponding to a lowest CORESET identifier, where the first set of beamforming parameters and the second set of beamforming parameters are determined based on the determined CORESET.

In some cases, UE 115-e may identify a first single TRP TCI state for the first TRP and a second single TRP TCI state for the second TRP based on the CORESET corresponding to the lowest CORESET identifier, where the CORESET corresponding to the lowest CORESET identifier may include a first multiple TRP CORESET. In some cases, the first set of beamforming parameters may be determined based on the identified first single TRP TCI state and the second set of beamforming parameters may be determined based on the identified second single TRP TCI state.

In some examples, UE 115-e may identify one or more slots where simultaneous multiple beams have been configured by a base station, where the first beam and second beam are received based on the identified one or more slots. In some cases, UE 115-e may have previously transmitted a negative acknowledgement corresponding to an initial downlink transmission from the base station 105-c, where the one or more slots are identified based on the transmitted negative acknowledgement.

At 720, UE 115-e may buffer a first set of downlink transmissions received on the first beam from the TRP 705-a and a second set of downlink transmissions received on the second beam from the TRP 705-b.

At 725, UE 115-e may decode the buffered first set of downlink transmissions and the buffered second set of downlink transmissions.

As discussed herein, in some cases, UE 115-e may identify a configuration of one or more CORESETs for the UE 115-e to monitor in a slot and determine the first set of beamforming parameters and the second set of beamforming parameters based on the identified configuration.

Figure 8:
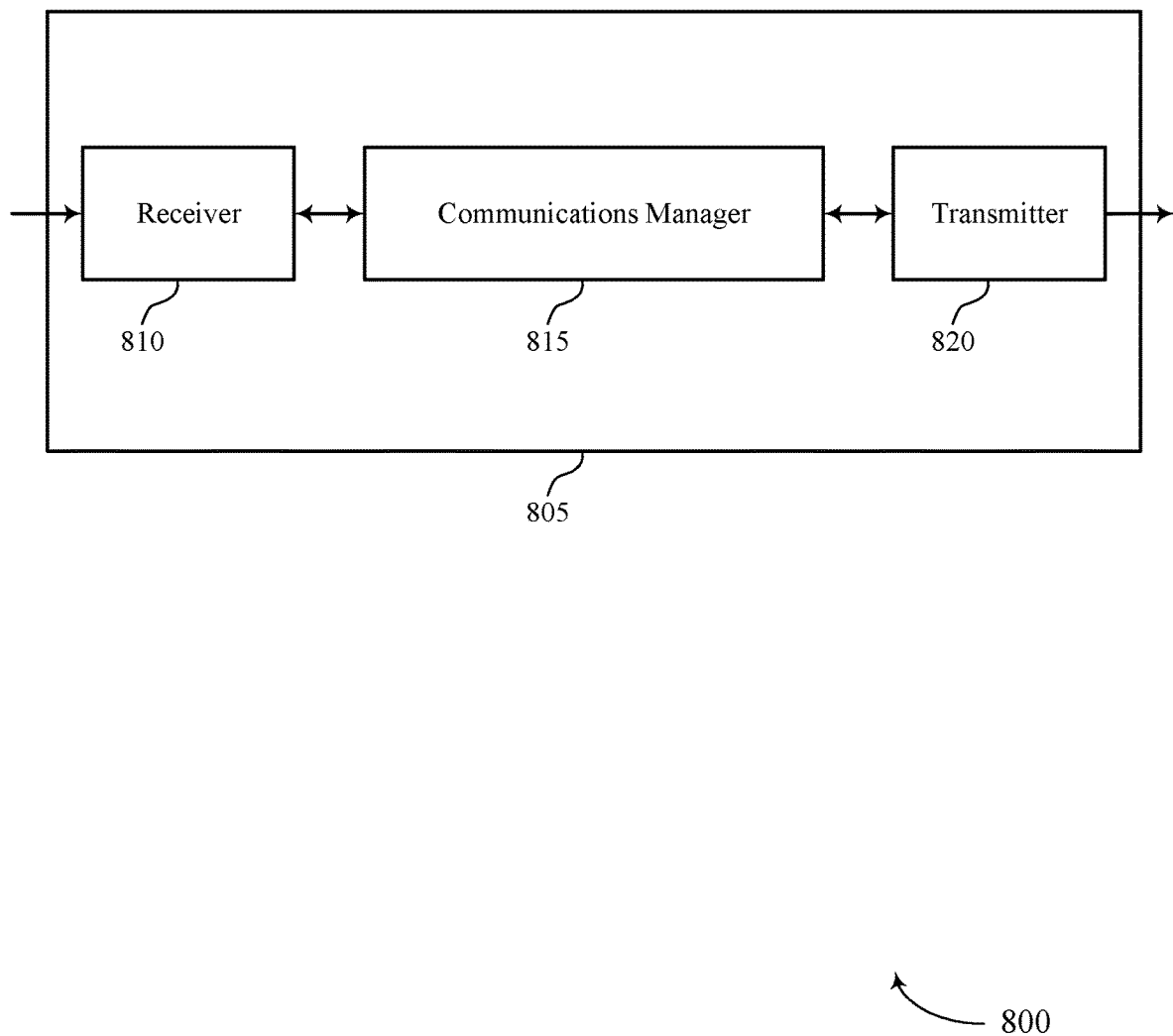
FIGS. 8 and 9 show block diagrams of devices that support simultaneous multiple default beams in accordance with aspects of the present disclosure.

FIG. 8 shows a block diagram 800 of a device 805 that supports simultaneous multiple default beams in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to simultaneous multiple default beams, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify that an offset between a physical downlink control channel and a physical downlink shared channel is below a threshold, receive, based on the identification that the offset is below the threshold, a first beam from a first transmission reception point using a first set of beamforming parameters and a second beam from a second transmission reception point using a second set of beamforming parameters, buffer a first set of downlink transmissions received on the first beam from the first transmission reception point and a second set of downlink transmissions received on the second beam from the second transmission reception point, and decode the buffered first set of downlink transmissions and the buffered second set of downlink transmissions. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
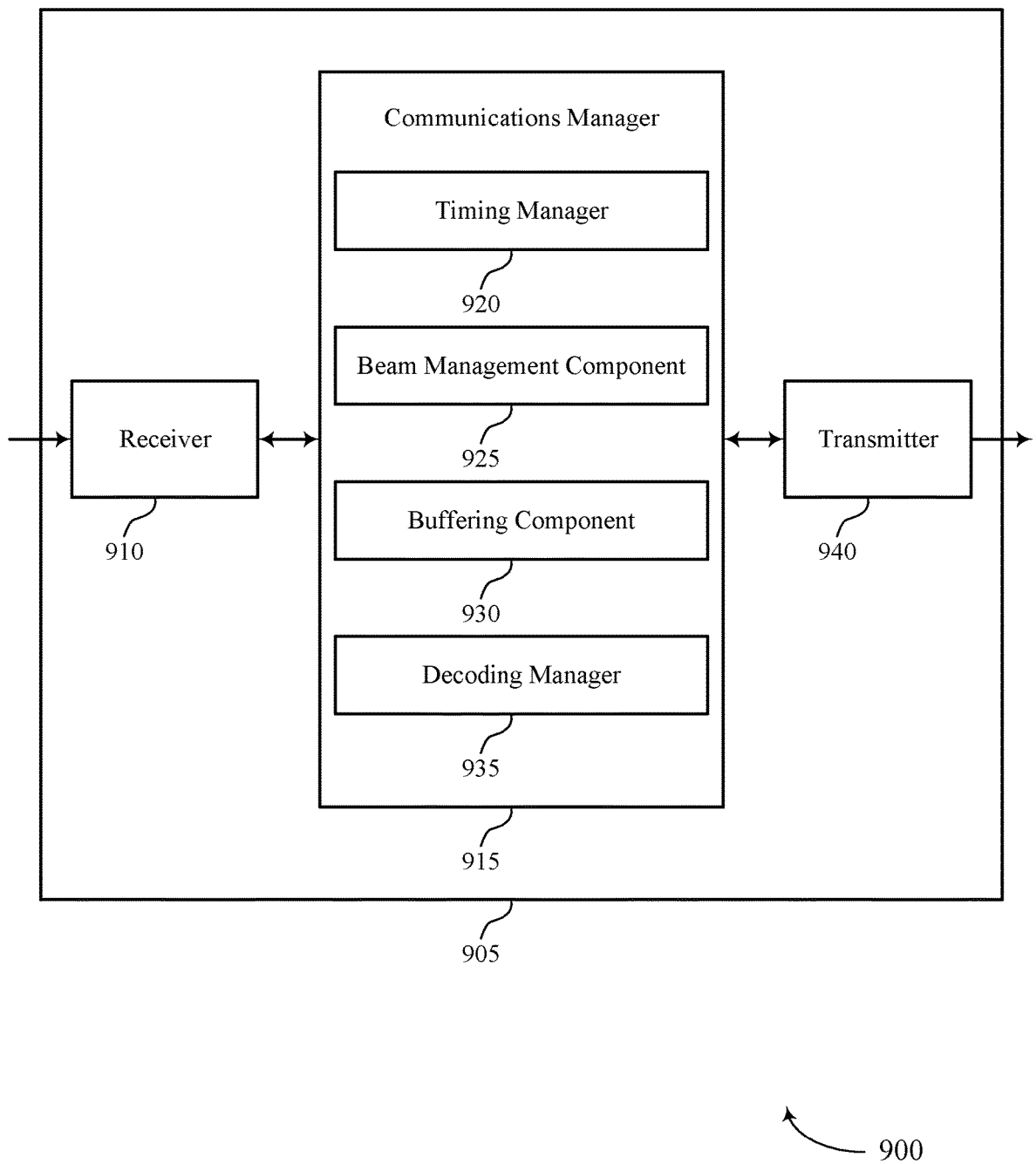

FIG. 9 shows a block diagram 900 of a device 905 that supports simultaneous multiple default beams in accordance with aspects of the present disclosure. The device 905 may be an example of aspects of a device 805, or a UE 115 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to simultaneous multiple default beams, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a timing manager 920, a beam management component 925, a buffering component 930, and a decoding manager 935. The communications manager 915 may be an example of aspects of the communications manager 1110 described herein.

The timing manager 920 may identify that an offset between a physical downlink control channel and a physical downlink shared channel is below a threshold. The beam management component 925 may receive (e.g., simultaneously), based on the identification that the offset is below the threshold, a first beam from a first transmission reception point using a first set of beamforming parameters and a second beam from a second transmission reception point using a second set of beamforming parameters. The buffering component 930 may buffer a first set of downlink transmissions received on the first beam from the first transmission reception point and a second set of downlink transmissions received on the second beam from the second transmission reception point. The decoding manager 935 may decode the buffered first set of downlink transmissions and the buffered second set of downlink transmissions.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

In some examples, communications manager 915 may be implemented as an integrated circuit or chipset for a mobile device modem, and the receiver 910 and transmitter 920 may be implemented as analog components (e.g., amplifiers, filters, antennas, etc.) coupled with the mobile device modem to enable wireless transmission and reception.

The communications manager 915 as described herein may be implemented to realize one or more potential advantages. Various implementations may enable the device 905 to decode control information in a PDCCH transmission in time to configure receive parameters used to receive and decode the PDSCH transmission. At least one implementation may enable the device 905 to receive beams simultaneously.

Based on implementing the simultaneous multiple default beams as described herein, one or more processors of the device 905 (e.g., processor(s) controlling or incorporated with one or more of receiver 910, communications manager 915, and transmitter 920) may reduce an amount of time required to effectively decode data streams transmitted from multiple serving TRPs. In addition, techniques described herein may reduce latency and increase communications efficiency in the wireless network.

Figure 10:
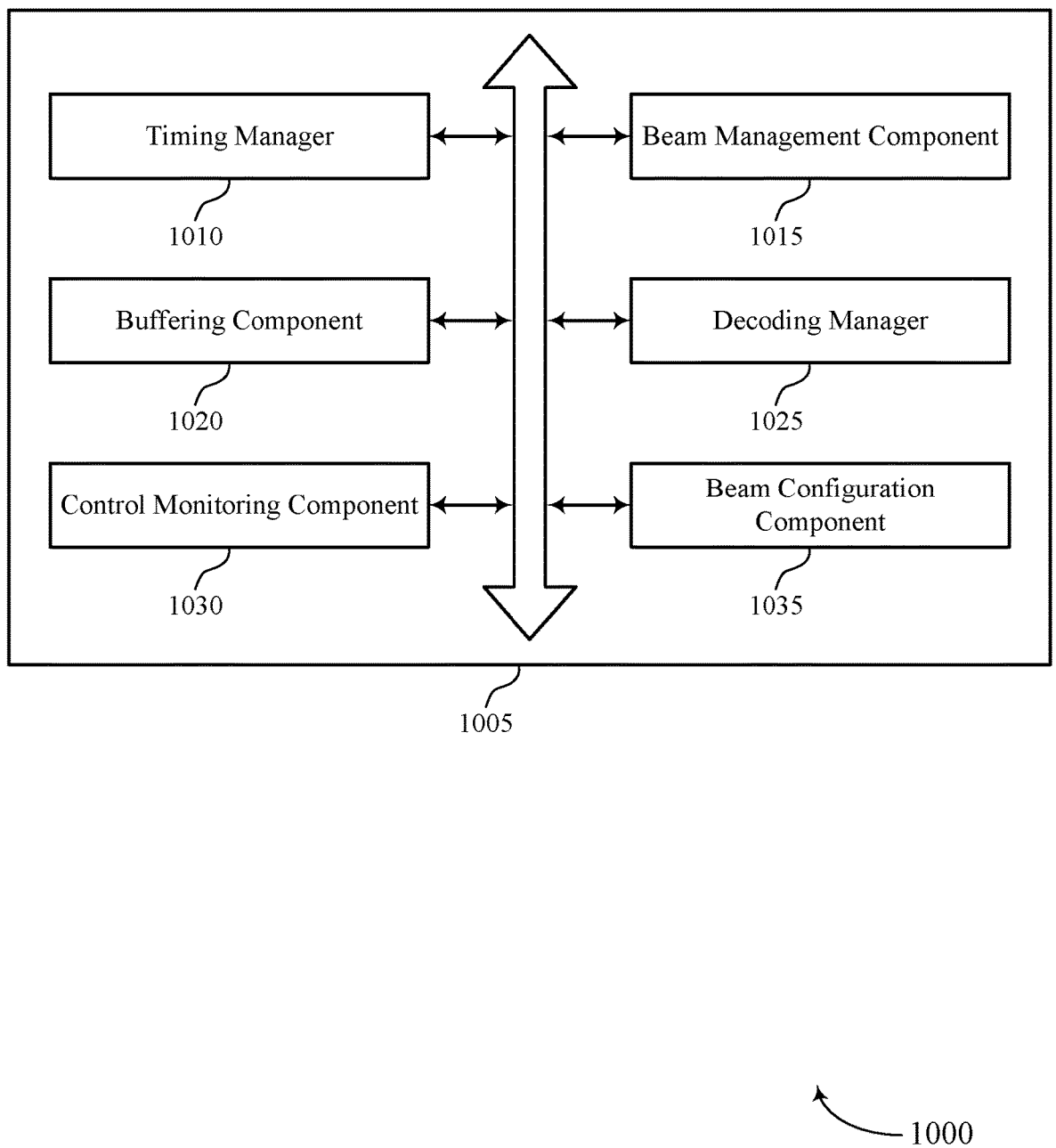
FIG. 10 shows a block diagram of a communications manager that supports simultaneous multiple default beams in accordance with aspects of the present disclosure.

FIG. 10 shows a block diagram 1000 of a communications manager 1005 that supports simultaneous multiple default beams in accordance with aspects of the present disclosure. The communications manager 1005 may be an example of aspects of a communications manager 815, a communications manager 915, or a communications manager 1110 described herein. The communications manager 1005 may include a timing manager 1010, a beam management component 1015, a buffering component 1020, a decoding manager 1025, a control monitoring component 1030, and a beam configuration component 1035. Each of these modules may communicate, directly or indirectly, with one another (e.g., via one or more buses).

The timing manager 1010 may identify that an offset between a physical downlink control channel and a physical downlink shared channel is below a threshold.

The beam management component 1015 may receive, based on the identification that the offset is below the threshold, a first beam from a first transmission reception point using a first set of beamforming parameters and a second beam from a second transmission reception point using a second set of beamforming parameters. In some examples, the beam management component 1015 may both the first beam and the second beam are received in parallel during a first symbol. In some examples, the beam management component 1015 may transmit a UE receive panel ID report indicating one or more pairs of beams that can be received by the UE simultaneously, where each beams of each of the one or more pairs of beams corresponds to different UE receive panels.

In some examples, the beam management component 1015 may transmit a negative acknowledgement corresponding to an initial downlink transmission from the base station, where the one or more slots are identified based on the transmitted negative acknowledgement. In some examples, the beam management component 1015 may transmit an acknowledgement corresponding to an initial downlink transmission.

In some cases, the first beam is received during a first symbol and the second beam is received during a second symbol. In some cases, the UE receive panel ID report indicates one or more simultaneously receivable control resource set groups, where the one or more simultaneously receivable control resource set groups includes one or more multiple control resource sets from different transmission reception points. In some cases, the UE receive panel ID report includes a matrix, where each entry of the matrix indicates whether two control resource sets from two transmission reception points corresponding to the entry are a simultaneously receivable group.

The buffering component 1020 may buffer a first set of downlink transmissions received on the first beam from the first transmission reception point and a second set of downlink transmissions received on the second beam from the second transmission reception point.

The decoding manager 1025 may decode the buffered first set of downlink transmissions and the buffered second set of downlink transmissions.

The control monitoring component 1030 may identify a configuration of one or more control resource sets for the UE to monitor in a slot. In some examples, the control monitoring component 1030 may identify a subset of the one or more control resource sets for determining the first set of beamforming parameters and the second set of beam forming parameters.

In some examples, the control monitoring component 1030 may receive an indication of the subset of the one or more control resource sets, where the subset of the one or more control resource sets is identified based on the indication. In some examples, the control monitoring component 1030 may identify a first UE receive panel identification for the first beam from the first transmission reception point. In some examples, the control monitoring component 1030 may identify a second UE receive panel identification for the second beam from the second transmission reception point. In some examples, the control monitoring component 1030 may receive an indication that the first beam and the second beam are configured, where the first and second beam are received based on the received indication.

In some cases, the subset of the one or more control resource sets includes one or more single transmission reception point control resource sets, one or more multiple transmission reception point control resource sets, or some combination thereof. In some cases, the indication is received in radio resource control signaling, a media access control element, or downlink control information. In some cases, the subset of the one or more control resource sets includes both one or more single transmission reception point control resource sets and one or more multiple transmission reception point control resource sets. In some cases, the subset of the one or more control resource sets includes one or more multiple transmission reception point control resource sets.

The beam configuration component 1035 may determine the first set of beamforming parameters and the second set of beam forming parameters based on the identified configuration. In some examples, the beam configuration component 1035 may determine, from the subset of the one or more control resource sets, a control resource set corresponding to a lowest control resource set identifier, where the first set of beamforming parameters and the second set of beam forming parameters are determined based on the determined control resource set.

In some examples, identifying a first single transmission reception point transmission configuration indicator state for the first transmission reception point and a second single transmission reception point transmission configuration indicator state for the second transmission reception point based on the control resource set corresponding to the lowest control resource set identifier, where the control resource set corresponding to the lowest control resource set identifier includes a first multiple transmission reception point control resource set.

In some examples, the beam configuration component 1035 may identify one or more slots where simultaneous multiple beams have been configured by a base station, where the first beam and second beam are received based on the identified one or more slots. In some examples, the beam configuration component 1035 may receive an indication of the one or more slots where simultaneous multiple beams have been configured from the base station based on the base station missing the acknowledgement, where one or more slots where simultaneous multiple beams have been configured are identified based on the indication. In some cases, the first set of beamforming parameters are determined based on the identified first single transmission reception point transmission configuration indicator state and the second set of beam forming parameters are determined based on the identified second single transmission reception point transmission configuration indicator state.

Figure 11:
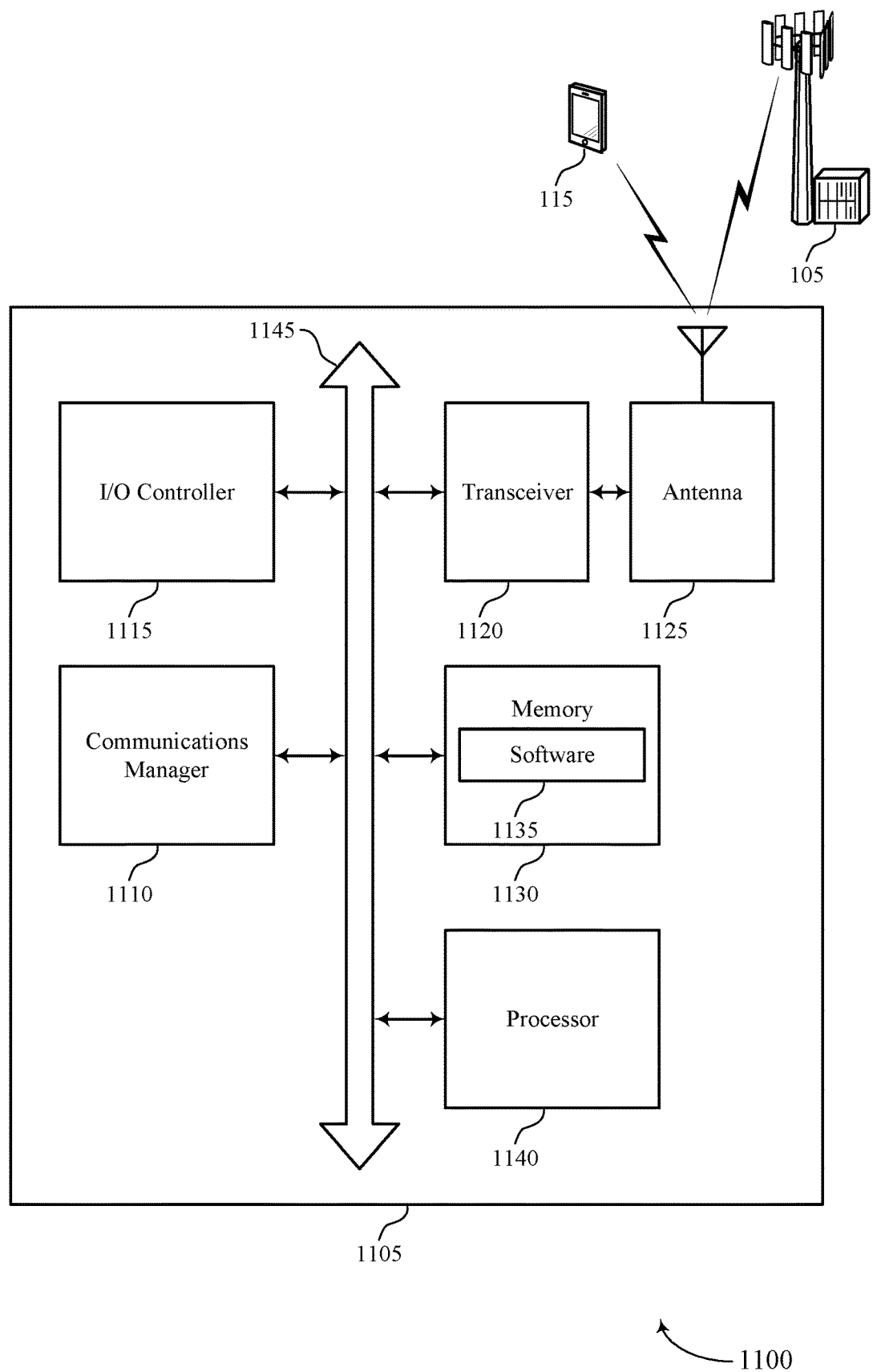
FIG. 11 shows a diagram of a system including a device that supports simultaneous multiple default beams in accordance with aspects of the present disclosure.

FIG. 11 shows a diagram of a system 1100 including a device 1105 that supports simultaneous multiple default beams in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may identify that an offset between a physical downlink control channel and a physical downlink shared channel is below a threshold, receive, based on the identification that the offset is below the threshold, a first beam from a first transmission reception point using a first set of beamforming parameters and a second beam from a second transmission reception point using a second set of beamforming parameters, buffer a first set of downlink transmissions received on the first beam from the first transmission reception point and a second set of downlink transmissions received on the second beam from the second transmission reception point, and decode the buffered first set of downlink transmissions and the buffered second set of downlink transmissions.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code or software 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting simultaneous multiple default beams).

The software 1135 may include instructions to implement aspects of the present disclosure, including instructions to support wireless communications. The software 1135 may be stored in a non-transitory computer-readable medium such as system memory or other type of memory. In some cases, the software 1135 may not be directly executable by the processor 1140 but may cause a computer (e.g., when compiled and executed) to perform functions described herein.

Figure 12:
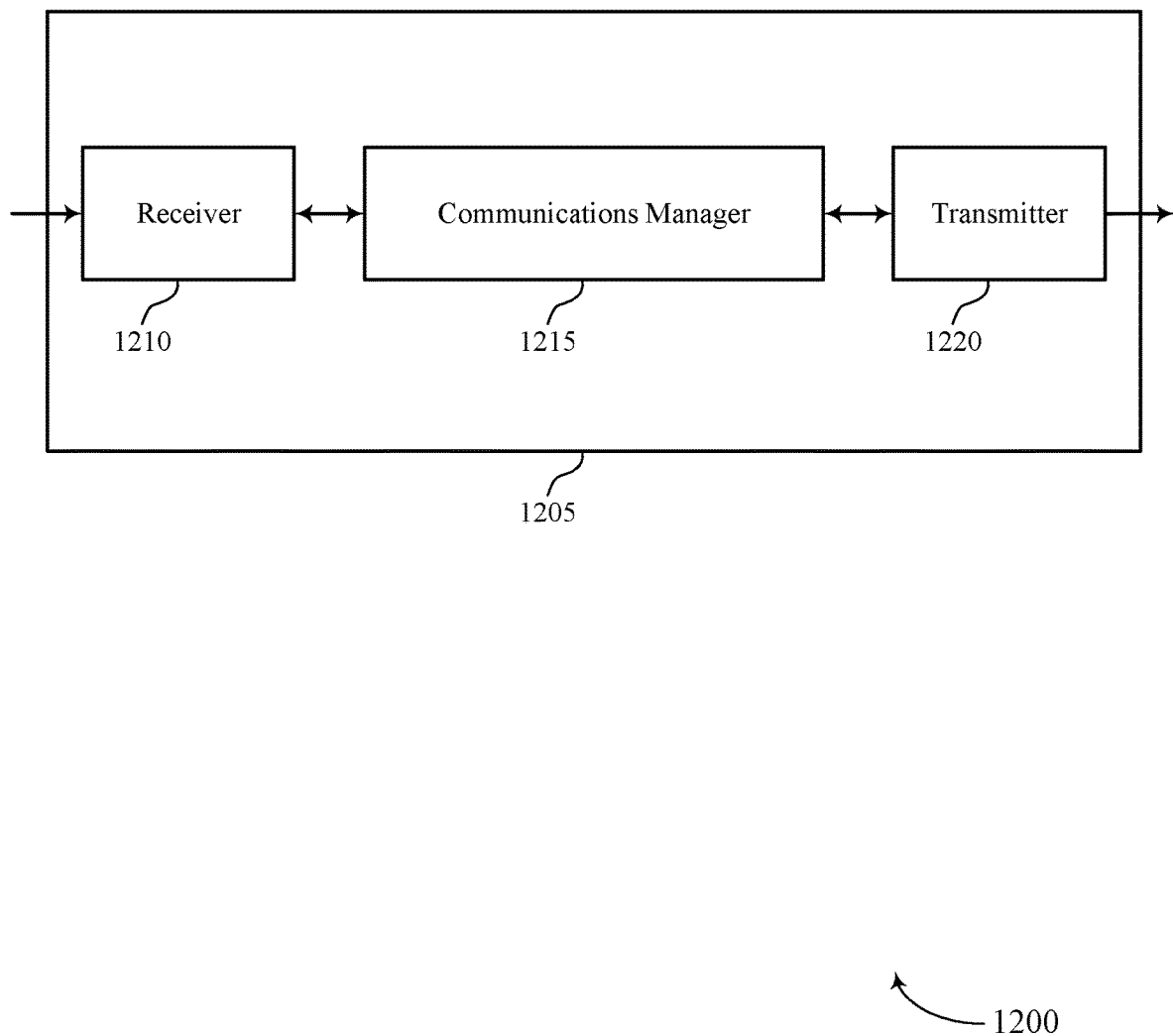
FIGS. 12 and 13 show block diagrams of devices that support simultaneous multiple default beams in accordance with aspects of the present disclosure.

FIG. 12 shows a block diagram 1200 of a device 1205 that supports simultaneous multiple default beams in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to simultaneous multiple default beams, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may identify that an offset between a physical downlink control channel and a physical downlink shared channel is below a threshold, identify a first beam for a first transmission reception point and a second beam for a second transmission reception point based on the identification that the offset is below the threshold, and schedule a simultaneous transmission from the first transmission reception point and the second transmission reception point, where the first transmission reception point is scheduled based on the identified first beam and the second transmission reception point is scheduled based on the identified second beam. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
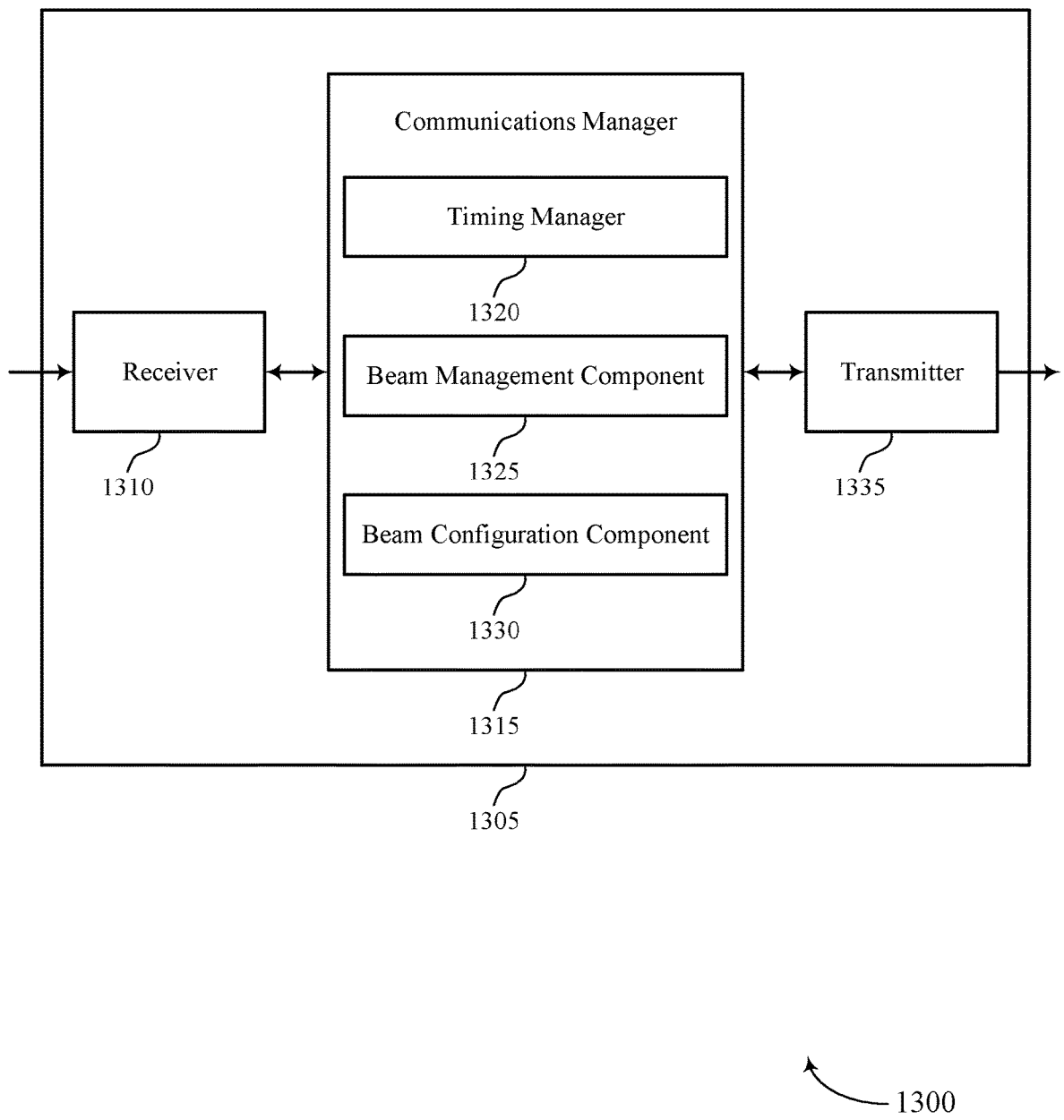

FIG. 13 shows a block diagram 1300 of a device 1305 that supports simultaneous multiple default beams in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to simultaneous multiple default beams, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a timing manager 1320, a beam management component 1325, and a beam configuration component 1330. The communications manager 1315 may be an example of aspects of the communications manager 1510 described herein.

The timing manager 1320 may identify that an offset between a physical downlink control channel and a physical downlink shared channel is below a threshold. The beam management component 1325 may identify a first beam for a first transmission reception point and a second beam for a second transmission reception point based on the identification that the offset is below the threshold. The beam configuration component 1330 may schedule a simultaneous transmission from the first transmission reception point and the second transmission reception point, where the first transmission reception point is scheduled based on the identified first beam and the second transmission reception point is scheduled based on the identified second beam.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
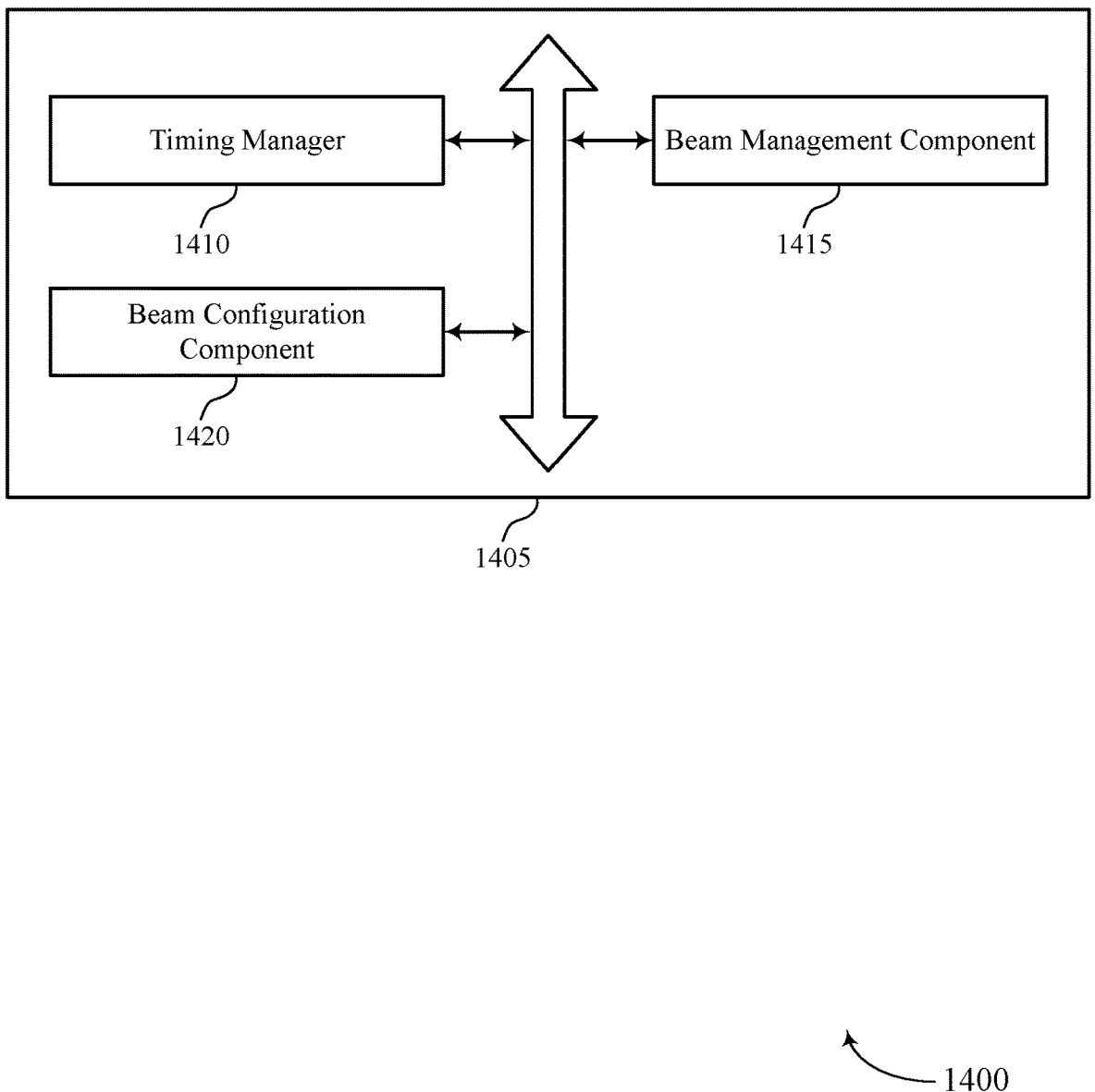
FIG. 14 shows a block diagram of a communications manager that supports simultaneous multiple default beams in accordance with aspects of the present disclosure.

FIG. 14 shows a block diagram 1400 of a communications manager 1405 that supports simultaneous multiple default beams in accordance with aspects of the present disclosure. The communications manager 1405 may be an example of aspects of a communications manager 1215, a communications manager 1315, or a communications manager 1510 described herein. The communications manager 1405 may include a timing manager 1410, a beam management component 1415, and a beam configuration component 1420. Each of these modules may communicate, directly or indirectly, with one another (e.g., via one or more buses).

The timing manager 1410 may identify that an offset between a physical downlink control channel and a physical downlink shared channel is below a threshold.

The beam management component 1415 may identify a first beam for a first transmission reception point and a second beam for a second transmission reception point based on the identification that the offset is below the threshold. In some examples, the beam management component 1415 may identify a first single transmission reception point transmission configuration indicator state for the first transmission reception point and a second single transmission reception point transmission configuration indicator state for the second transmission reception point, where a control resource set corresponding to a lowest control resource set identifier of the subset of the one or more control resource sets is based on the identified first single transmission reception point transmission configuration indicator state and the identified second single transmission reception point transmission configuration indicator state.

In some cases, the first transmission reception point and the second transmission reception point are scheduled to simultaneously transmit in parallel during a first symbol. In some cases, the first transmission reception point and is scheduled to transmit during a first symbol and the second transmission reception point and is scheduled to transmit during a second symbol.

The beam configuration component 1420 may schedule a simultaneous transmission from the first transmission reception point and the second transmission reception point, where the first transmission reception point is scheduled based on the identified first beam and the second transmission reception point is scheduled based on the identified second beam. In some examples, the beam configuration component 1420 may identify a configuration of one or more control resource sets for a UE to monitor in a slot. In some examples, the beam configuration component 1420 may transmit an indication of the configuration to the UE. In some examples, the beam configuration component 1420 may identify a subset of the one or more control resource sets for UE determination of a set of beamforming parameters for receiving the first beam, the second beam, or both.

In some examples, the beam configuration component 1420 may transmit an indication of the subset of the one or more control resource sets to the UE. In some examples, the beam configuration component 1420 may receive a UE receive panel ID report indicating one or more pairs of beams that can be received by the UE simultaneously, where each beams of each of the one or more pairs of beams corresponds to different UE receive panels. In some examples, the beam configuration component 1420 may transmit an indication that the first beam and the second beam are configured, where the simultaneous transmission from the first transmission reception point and the second transmission reception point is scheduled based on the transmitted indication. In some examples, the beam configuration component 1420 may configure one or more slots for simultaneous multiple beams, where the simultaneous transmission from the first transmission reception point and the second transmission reception point is scheduled based on the identified one or more slots.

In some examples, the beam configuration component 1420 may receive, from a UE, a negative acknowledgement corresponding to an initial downlink transmission from the base station, where the one or more slots are configured based on the received negative acknowledgement. In some examples, the beam configuration component 1420 may transmit an indication of the one or more slots where simultaneous multiple beams have been configured based on missing an expected acknowledgement from a UE. In some cases, the subset of the one or more control resource sets includes one or more single transmission reception point control resource sets, one or more multiple transmission reception point control resource sets, or some combination thereof.

In some cases, the indication of the subset of the one or more control resource sets is transmitted in radio resource control signaling, a media access control element, or downlink control information. In some cases, the subset of the one or more control resource sets includes both one or more single transmission reception point control resource sets and one or more multiple transmission reception point control resource sets. In some cases, the subset of the one or more control resource sets includes one or more multiple transmission reception point control resource sets. In some cases, the first beam and the second beam are associated with a first control resource set of the subset of the one or more control resource sets, the first control resource set corresponding to a lowest control resource set.

In some cases, the UE receive panel ID report indicates one or more simultaneously receivable control resource set groups, where the one or more simultaneously receivable control resource set groups includes one or more multiple control resource sets from different transmission reception points. In some cases, the UE receive panel ID report includes a matrix, where each entry of the matrix indicates whether two control resource sets from two transmission reception points corresponding to the entry are a simultaneously receivable group. In some cases, the indication is transmitted in radio resource control signaling, a media access control element, or downlink control information.

Figure 15:
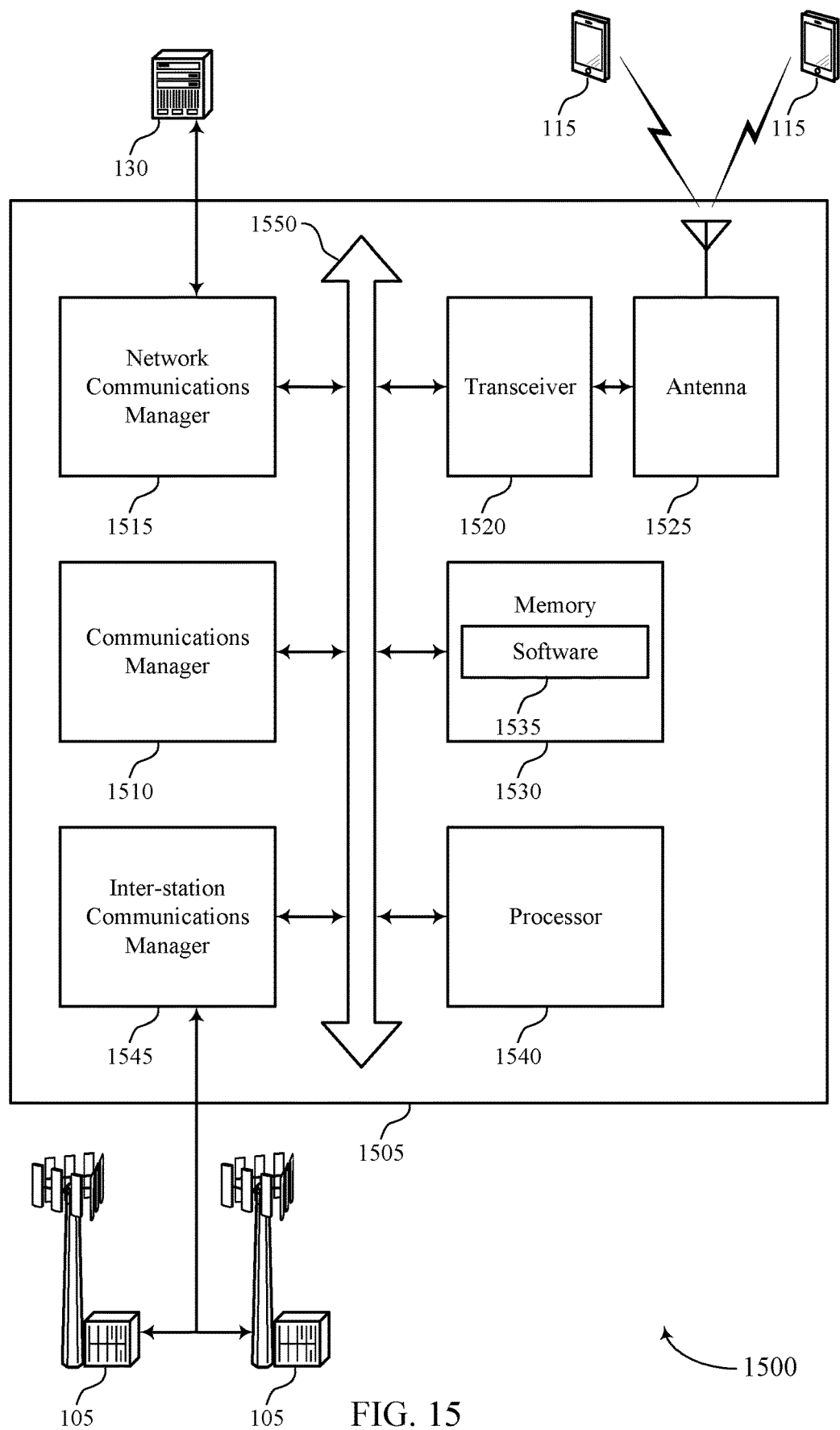
FIG. 15 shows a diagram of a system including a device that supports simultaneous multiple default beams in accordance with aspects of the present disclosure.

FIG. 15 shows a diagram of a system 1500 including a device 1505 that supports simultaneous multiple default beams in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may identify that an offset between a physical downlink control channel and a physical downlink shared channel is below a threshold, identify a first beam for a first transmission reception point and a second beam for a second transmission reception point based on the identification that the offset is below the threshold, and schedule a simultaneous transmission from the first transmission reception point and the second transmission reception point, where the first transmission reception point is scheduled based on the identified first beam and the second transmission reception point is scheduled based on the identified second beam.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code or software 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting simultaneous multiple default beams).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The software 1535 may include instructions to implement aspects of the present disclosure, including instructions to support wireless communications. The software 1535 may be stored in a non-transitory computer-readable medium such as system memory or other type of memory. In some cases, the software 1535 may not be directly executable by the processor 1540 but may cause a computer (e.g., when compiled and executed) to perform functions described herein.

Figure 16:
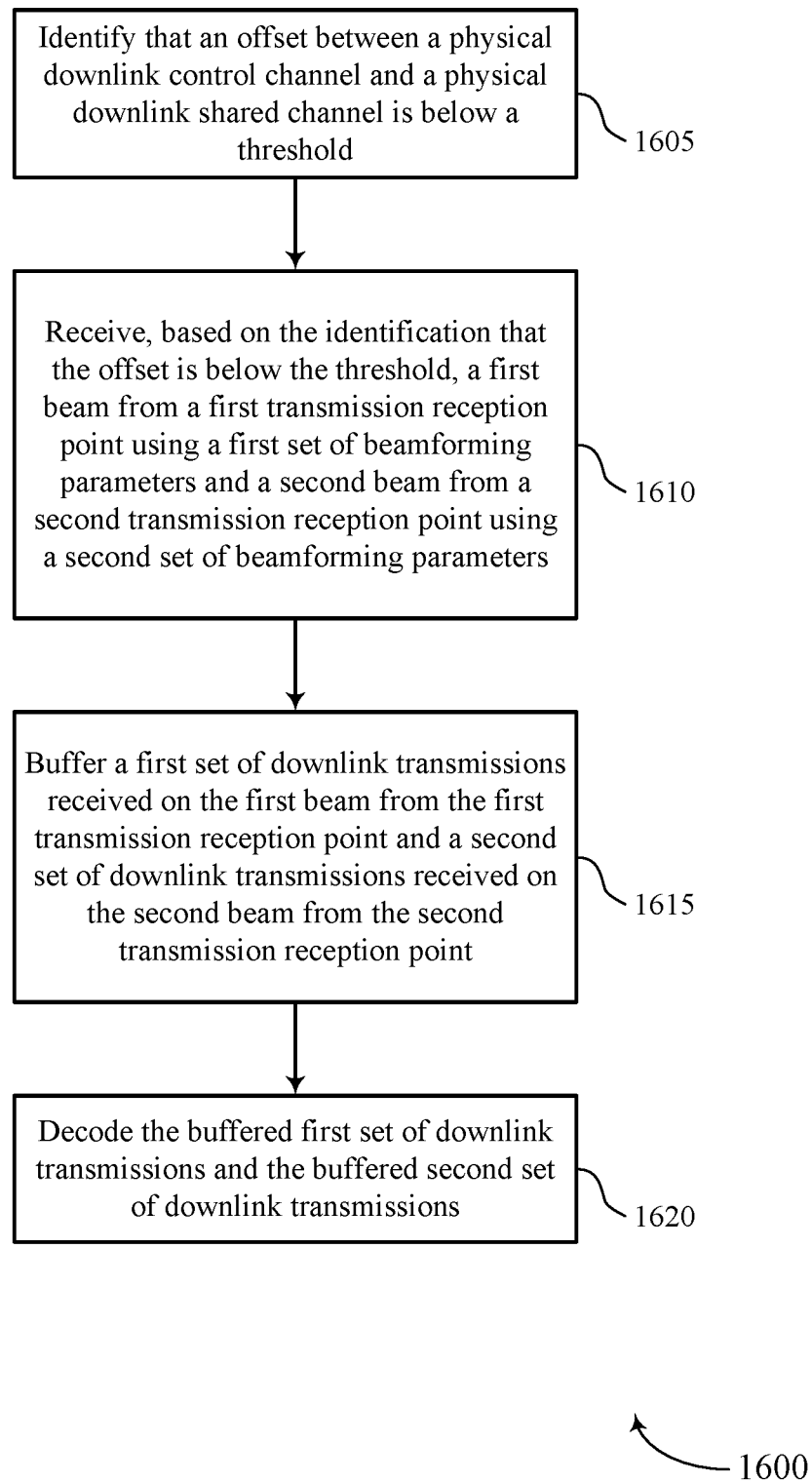
FIGS. 16 through 19 show flowcharts illustrating methods that support simultaneous multiple default beams in accordance with aspects of the present disclosure.

FIG. 16 shows a flowchart illustrating a method 1600 that supports simultaneous multiple default beams in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may identify that an offset between a physical downlink control channel and a physical downlink shared channel is below a threshold. The operations of 1605 may be performed according to the methods described herein. In some examples, aspects of the operations of 1605 may be performed by a timing manager as described with reference to FIGS. 8 through 11.

At 1610, the UE may receive, based on the identification that the offset is below the threshold, a first beam from a first transmission reception point using a first set of beamforming parameters and a second beam from a second transmission reception point using a second set of beamforming parameters. The operations of 1610 may be performed according to the methods described herein. In some examples, aspects of the operations of 1610 may be performed by a beam management component as described with reference to FIGS. 8 through 11.

At 1615, the UE may buffer a first set of downlink transmissions received on the first beam from the first transmission reception point and a second set of downlink transmissions received on the second beam from the second transmission reception point. The operations of 1615 may be performed according to the methods described herein. In some examples, aspects of the operations of 1615 may be performed by a buffering component as described with reference to FIGS. 8 through 11.

At 1620, the UE may decode the buffered first set of downlink transmissions and the buffered second set of downlink transmissions. The operations of 1620 may be performed according to the methods described herein. In some examples, aspects of the operations of 1620 may be performed by a decoding manager as described with reference to FIGS. 8 through 11.

Figure 17:
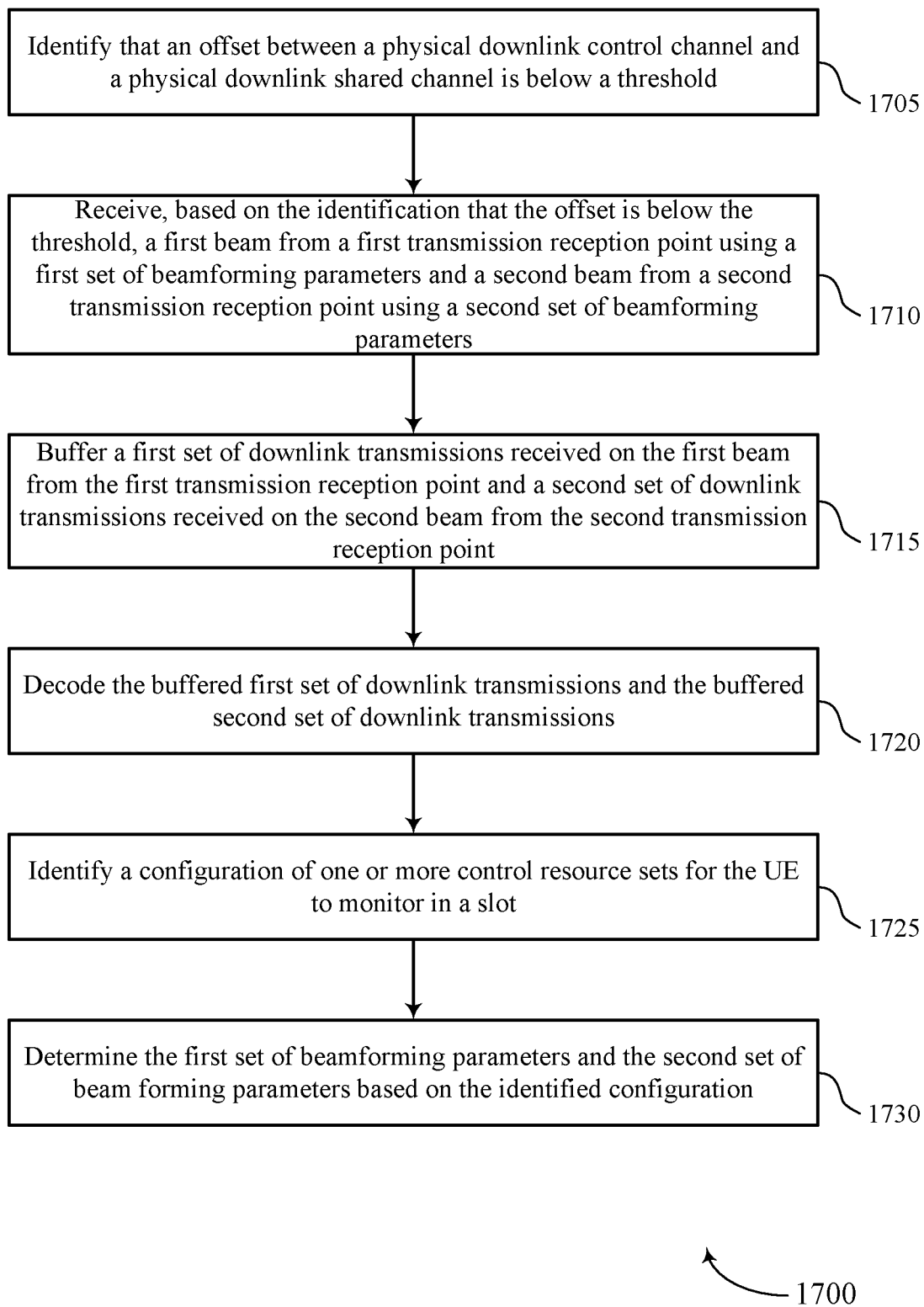

FIG. 17 shows a flowchart illustrating a method 1700 that supports simultaneous multiple default beams in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may identify that an offset between a physical downlink control channel and a physical downlink shared channel is below a threshold. The operations of 1705 may be performed according to the methods described herein. In some examples, aspects of the operations of 1705 may be performed by a timing manager as described with reference to FIGS. 8 through 11.

At 1710, the UE may receive (e.g., simultaneously), based on the identification that the offset is below the threshold, a first beam from a first transmission reception point using a first set of beamforming parameters and a second beam from a second transmission reception point using a second set of beamforming parameters. The operations of 1710 may be performed according to the methods described herein. In some examples, aspects of the operations of 1710 may be performed by a beam management component as described with reference to FIGS. 8 through 11.

At 1715, the UE may buffer a first set of downlink transmissions received on the first beam from the first transmission reception point and a second set of downlink transmissions received on the second beam from the second transmission reception point. The operations of 1715 may be performed according to the methods described herein. In some examples, aspects of the operations of 1715 may be performed by a buffering component as described with reference to FIGS. 8 through 11.

At 1720, the UE may decode the buffered first set of downlink transmissions and the buffered second set of downlink transmissions. The operations of 1720 may be performed according to the methods described herein. In some examples, aspects of the operations of 1720 may be performed by a decoding manager as described with reference to FIGS. 8 through 11.

At 1725, the UE may identify a configuration of one or more control resource sets for the UE to monitor in a slot. The operations of 1725 may be performed according to the methods described herein. In some examples, aspects of the operations of 1725 may be performed by a control monitoring component as described with reference to FIGS. 8 through 11.

At 1730, the UE may determine the first set of beamforming parameters and the second set of beam forming parameters based on the identified configuration. The operations of 1730 may be performed according to the methods described herein. In some examples, aspects of the operations of 1730 may be performed by a beam configuration component as described with reference to FIGS. 8 through 11.

Figure 18:
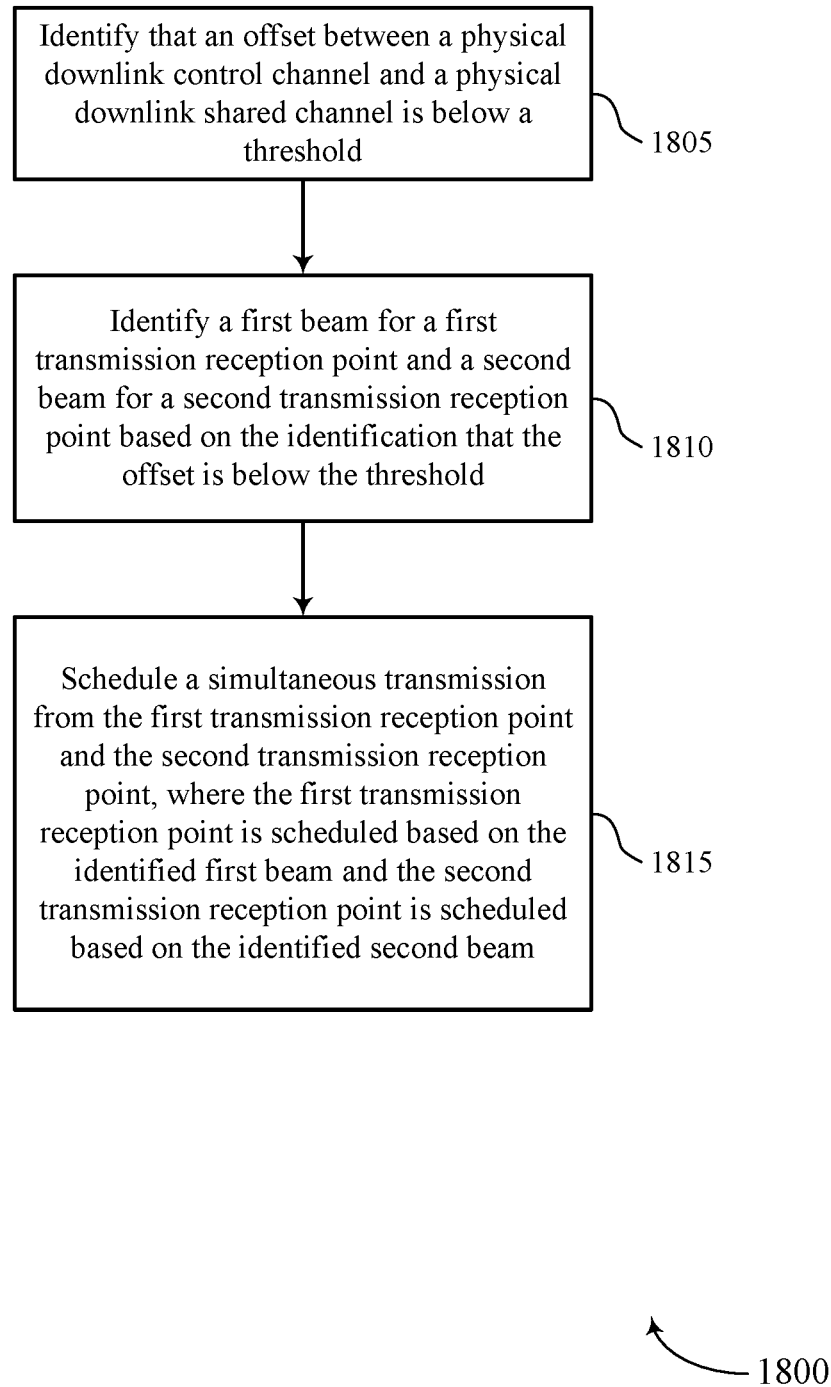

FIG. 18 shows a flowchart illustrating a method 1800 that supports simultaneous multiple default beams in accordance with aspects of the present disclosure. The operations of method 1800 may be implemented by a base station 105 or its components as described herein. For example, the operations of method 1800 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1805, the base station may identify that an offset between a physical downlink control channel and a physical downlink shared channel is below a threshold. The operations of 1805 may be performed according to the methods described herein. In some examples, aspects of the operations of 1805 may be performed by a timing manager as described with reference to FIGS. 12 through 15.

At 1810, the base station may identify a first beam for a first transmission reception point and a second beam for a second transmission reception point based on the identification that the offset is below the threshold. The operations of 1810 may be performed according to the methods described herein. In some examples, aspects of the operations of 1810 may be performed by a beam management component as described with reference to FIGS. 12 through 15.

At 1815, the base station may schedule a simultaneous transmission from the first transmission reception point and the second transmission reception point, where the first transmission reception point is scheduled based on the identified first beam and the second transmission reception point is scheduled based on the identified second beam. The operations of 1815 may be performed according to the methods described herein. In some examples, aspects of the operations of 1815 may be performed by a beam configuration component as described with reference to FIGS. 12 through 15.

Figure 19:
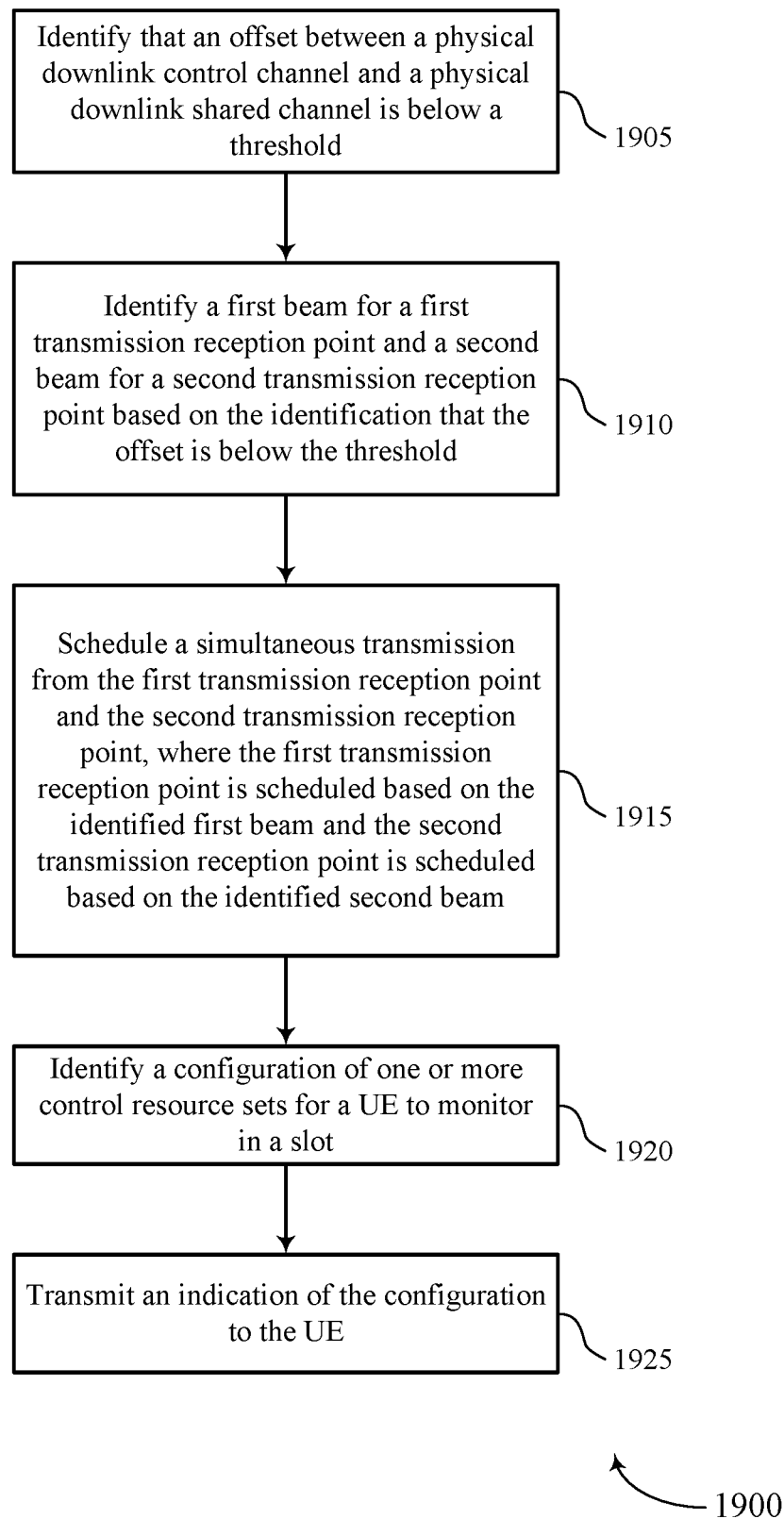

FIG. 19 shows a flowchart illustrating a method 1900 that supports simultaneous multiple default beams in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may identify that an offset between a physical downlink control channel and a physical downlink shared channel is below a threshold. The operations of 1905 may be performed according to the methods described herein. In some examples, aspects of the operations of 1905 may be performed by a timing manager as described with reference to FIGS. 12 through 15.

At 1910, the base station may identify a first beam for a first transmission reception point and a second beam for a second transmission reception point based on the identification that the offset is below the threshold. The operations of 1910 may be performed according to the methods described herein. In some examples, aspects of the operations of 1910 may be performed by a beam management component as described with reference to FIGS. 12 through 15.

At 1915, the base station may schedule a simultaneous transmission from the first transmission reception point and the second transmission reception point, where the first transmission reception point is scheduled based on the identified first beam and the second transmission reception point is scheduled based on the identified second beam. The operations of 1915 may be performed according to the methods described herein. In some examples, aspects of the operations of 1915 may be performed by a beam configuration component as described with reference to FIGS. 12 through 15.

At 1920, the base station may identify a configuration of one or more control resource sets for a UE to monitor in a slot. The operations of 1920 may be performed according to the methods described herein. In some examples, aspects of the operations of 1920 may be performed by a beam configuration component as described with reference to FIGS. 12 through 15.

At 1925, the base station may transmit an indication of the configuration to the UE. The operations of 1925 may be performed according to the methods described herein. In some examples, aspects of the operations of 1925 may be performed by a beam configuration component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying that an offset between a physical downlink control channel and a physical downlink shared channel is below a threshold;
    receiving, based at least in part on the identification that the offset is below the threshold, a first beam from a first transmission reception point using a first set of beamforming parameters and a second beam from a second transmission reception point using a second set of beamforming parameters;
    buffering a first set of downlink transmissions received on the first beam from the first transmission reception point and a second set of downlink transmissions received on the second beam from the second transmission reception point; and
    decoding the buffered first set of downlink transmissions and the buffered second set of downlink transmissions.

2. The method of claim 1, wherein receiving the first beam and the second beam comprises:
    receiving the first beam and the second beam simultaneously.

3. The method of claim 1, wherein the UE identifies that that the offset is below the threshold for a symbol based at least in part on failing to identify a scheduled downlink signal known to the UE for the symbol.

4. The method of claim 1, further comprising:
    identifying a configuration of one or more control resource sets for the UE to monitor in a slot; and
    determining the first set of beamforming parameters and the second set of beam forming parameters based at least in part on the identified configuration.

5. The method of claim 4, further comprising:
identifying a subset of the one or more control resource sets for determining the first set of beamforming parameters and the second set of beam forming parameters; and
determining, from the subset of the one or more control resource sets, a control resource set corresponding to a lowest control resource set identifier, wherein the first set of beamforming parameters and the second set of beam forming parameters are determined based at least in part on the determined control resource set.

6. The method of claim 5, wherein the subset of the one or more control resource sets comprises one or more single transmission reception point control resource sets, one or more multiple transmission reception point control resource sets, or some combination thereof.

7. The method of claim 5, further comprising:
receiving an indication of the subset of the one or more control resource sets, wherein the subset of the one or more control resource sets is identified based at least in part on the indication.

8. The method of claim 7, wherein the indication is received in radio resource control signaling, a media access control element, or downlink control information.

9. The method of claim 5, wherein the subset of the one or more control resource sets comprises both one or more single transmission reception point control resource sets and one or more multiple transmission reception point control resource sets.

10. The method of claim 9, further comprising:
identifying a first single transmission reception point transmission configuration indicator state for the first transmission reception point and a second single transmission reception point transmission configuration indicator state for the second transmission reception point based at least in part on the control resource set corresponding to the lowest control resource set identifier, wherein the control resource set corresponding to the lowest control resource set identifier comprises a first multiple transmission reception point control resource set.

11. The method of claim 10, wherein the first set of beamforming parameters are determined based at least in part on the identified first single transmission reception point transmission configuration indicator state and the second set of beam forming parameters are determined based at least in part on the identified second single transmission reception point transmission configuration indicator state.

12. The method of claim 5, wherein the subset of the one or more control resource sets comprises one or more multiple transmission reception point control resource sets.

13. The method of claim 1, wherein:
both the first beam and the second beam are received in parallel during a first symbol.

14. The method of claim 1, wherein the first beam is received during a first symbol and the second beam is received during a second symbol.

15. The method of claim 1, further comprising:
identifying a first UE receive panel identification for the first beam from the first transmission reception point; and
identifying a second UE receive panel identification for the second beam from the second transmission reception point.

16. The method of claim 15, further comprising:
transmitting a UE receive panel ID report indicating one or more pairs of beams that can be received by the UE simultaneously, wherein each beam of each of the one or more pairs of beams corresponds to different UE receive panels.

17. The method of claim 16, wherein the UE receive panel ID report indicates one or more simultaneously receivable control resource set groups, wherein the one or more simultaneously receivable control resource set groups comprises one or more multiple control resource sets from different transmission reception points.

18. The method of claim 16, wherein the UE receive panel ID report comprises a matrix, where each entry of the matrix indicates whether two control resource sets from two transmission reception points corresponding to the entry are a simultaneously receivable group.

19. The method of claim 1, further comprising:
receiving an indication that the first beam and the second beam are configured, wherein the first and second beam are received based at least in part on the received indication.

20. The method of claim 19, wherein the indication is received in radio resource control signaling, a media access control element, or downlink control information.

21. The method of claim 1, further comprising:
identifying one or more slots where simultaneous multiple beams have been configured by a base station, wherein the first beam and second beam are received based at least in part on the identified one or more slots.

22. The method of claim 21, further comprising:
transmitting a negative acknowledgement corresponding to an initial downlink transmission from the base station, wherein the one or more slots are identified based at least in part on the transmitted negative acknowledgement.

23. The method of claim 21, further comprising:
transmitting an acknowledgement corresponding to an initial downlink transmission; and
receiving an indication of the one or more slots where simultaneous multiple beams have been configured from the base station based at least in part on the base station missing the acknowledgement, wherein one or more slots where simultaneous multiple beams have been configured are identified based at least in part on the indication.

24. A method for wireless communication at a base station, comprising:
identifying that an offset between a physical downlink control channel and a physical downlink shared channel is below a threshold;
identifying a first beam for a first transmission reception point and a second beam for a second transmission reception point based at least in part on the identification that the offset is below the threshold; and
scheduling a simultaneous transmission from the first transmission reception point and the second transmission reception point, wherein the first transmission reception point is scheduled based at least in part on the identified first beam and the second transmission reception point is scheduled based at least in part on the identified second beam.

25. The method of claim 24, wherein the first beam and the second beam are transmitted simultaneously by the first transmission reception point and the second transmission reception point.

26. The method of claim 24, further comprising:
identifying a configuration of one or more control resource sets for a user equipment (UE) to monitor in a slot; and
transmitting an indication of the configuration to the UE.

27. The method of claim 26, further comprising:
identifying a subset of the one or more control resource sets for UE determination of a set of beamforming parameters for receiving the first beam, the second beam, or both; and
transmitting an indication of the subset of the one or more control resource sets to the UE.

28. The method of claim 27, wherein the subset of the one or more control resource sets comprises one or more single transmission reception point control resource sets, one or more multiple transmission reception point control resource sets, or some combination thereof.

29. An apparatus for wireless communication at a user equipment (UE), comprising:
a processor,
memory in electronic communication with the processor; and
instructions stored in the memory and executable by the processor to cause the apparatus to:
identify that an offset between a physical downlink control channel and a physical downlink shared channel is below a threshold;
receive, based at least in part on the identification that the offset is below the threshold, a first beam from a first transmission reception point using a first set of beamforming parameters and a second beam from a second transmission reception point using a second set of beamforming parameters;
buffer a first set of downlink transmissions received on the first beam from the first transmission reception point and a second set of downlink transmissions received on the second beam from the second transmission reception point; and
decode the buffered first set of downlink transmissions and the buffered second set of downlink transmissions.

30. An apparatus for wireless communication at a base station, comprising:
a processor,
memory in electronic communication with the processor; and
instructions stored in the memory and executable by the processor to cause the apparatus to:
identify that an offset between a physical downlink control channel and a physical downlink shared channel is below a threshold;
identify a first beam for a first transmission reception point and a second beam for a second transmission reception point based at least in part on the identification that the offset is below the threshold; and
schedule a simultaneous transmission from the first transmission reception point and the second transmission reception point, wherein the first transmission reception point is scheduled based at least in part on the identified first beam and the second transmission reception point is scheduled based at least in part on the identified second beam.

* * * * *